(12) United States Patent
Chen et al.

(10) Patent No.: US 11,442,296 B2
(45) Date of Patent: Sep. 13, 2022

(54) WAVEGUIDE STRUCTURE AND METHOD FOR FORMING THE SAME

(71) Applicant: TAIWAN SEMICONDUCTOR MANUFACTURING COMPANY LTD., Hsinchu (TW)

(72) Inventors: Huan-Neng Chen, Taichung (TW); Feng-Wei Kuo, Hsinchu County (TW); Min-Hsiang Hsu, Hsinchu (TW); Lan-Chou Cho, Hsinchu (TW); Chewn-Pu Jou, Hsinchu (TW); Wen-Shiang Liao, Miaoli County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 129 days.

(21) Appl. No.: 16/933,865

(22) Filed: Jul. 20, 2020

(65) Prior Publication Data

US 2022/0019097 A1    Jan. 20, 2022

(51) Int. Cl.
  *G02F 1/035* (2006.01)
  *G02F 1/025* (2006.01)
(52) U.S. Cl.
  CPC .......... *G02F 1/025* (2013.01); *G02F 2203/48* (2013.01)
(58) Field of Classification Search
  CPC ........................... G02F 1/025; G02F 2203/48
  See application file for complete search history.

(56) References Cited

U.S. PATENT DOCUMENTS 6,970,611 B1 * 11/2005 Van Der Vliet ....... G02B 6/266
  257/3
8,380,016 B1 *  2/2013 Hochberg ............. G02F 1/2257
  385/3
9,817,294 B2   11/2017 Goi et al.
  (Continued)

FOREIGN PATENT DOCUMENTS

CN    104885004 A    9/2015
TW    I224205        11/2004
TW    I255931        6/2006

OTHER PUBLICATIONS

U.S. Pat. No. 9817294B2 Corresponds to CN104885004A.
  (Continued)

*Primary Examiner* — Ellen E Kim
(74) *Attorney, Agent, or Firm* — WPAT, P.C., Intellectual Property Attorneys; Anthony King

(57) ABSTRACT

An optical attenuating structure is provided. The optical attenuating structure includes a substrate, a waveguide, doping regions, an optical attenuating member, and a dielectric layer. The waveguide is extended over the substrate. The doping regions are disposed over the substrate, and include a first doping region, a second doping region opposite to the first doping region and separated from the first doping region by the waveguide, a first electrode extended over the substrate and in the first doping region, and a second electrode extended over the substrate and in the second doping region. The first optical attenuating member is coupled with the waveguide and disposed between the waveguide and the first electrode. The dielectric layer is disposed over the substrate and covers the waveguide, the doping regions and the first optical attenuating member.

20 Claims, 29 Drawing Sheets

(56) References Cited

U.S. PATENT DOCUMENTS

| | | | |
|---|---|---|---|
| 9,939,666 B2* | 4/2018 | Chen | G02B 6/134 |
| 9,989,787 B2* | 6/2018 | Chen | G02F 1/025 |
| 2005/0157983 A1 | 7/2005 | Aoki et al. | |
| 2012/0087613 A1* | 4/2012 | Rasras | G02F 1/2257 |
| | | | 257/E31.124 |
| 2015/0316793 A1* | 11/2015 | Ayazi | G02F 1/025 |
| | | | 385/3 |
| 2017/0062360 A1* | 3/2017 | Chang | H01L 21/78 |
| 2018/0372950 A1* | 12/2018 | Usami | G02F 1/025 |
| 2019/0253776 A1 | 8/2019 | Mazed et al. | |
| 2020/0124883 A1* | 4/2020 | Delisle-Simard | G02F 1/025 |

OTHER PUBLICATIONS

English Abstract of TWI224205.
Office Action, Cited Reference and Search Report dated Jun. 29, 2021 issued by the Taiwan Intellectual Property Office for the Taiwanese counterpart Application No. 110104467.
M. Nedeljkovic, R. Soref, and G. Mashanovich, Free-carrier electrorefraction and electroabsorption modulation predictions for silicon over the 1-14-um infrared wavelength range, Photonics Journal, IEEE, vol. 3, pp. 11711180, Dec. 2011.
Yung-Jr Hung, Chong-Jia Wu, Tse-Hung Chen, Tzu-Hsiang Yen, and Ya-Ching Liang, "Superior Temperature-Sensing Performance in Cladding-Modulated Si Waveguide Gratings," J. Lightwave Technol. 34, 4329-4335 (2016).

* cited by examiner

WAVEGUIDE STRUCTURE AND METHOD FOR FORMING THE SAME

BACKGROUND

An optical attenuator, or a fiber optic attenuator, is a device used to reduce the power level of an optical signal, either in free space or in an optical fiber. Optical attenuators are commonly used in fiber optic communications, either to test power level margins by temporarily adding a calibrated amount of signal loss, or installed permanently to properly match transmitter and receiver levels. Sharp bends stress optic fibers and can cause losses. If a received signal is too strong a temporary fix is to wrap the cable around a pencil until the desired level of attenuation is achieved. However, such arrangements are unreliable, since the stressed fiber tends to break over time.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
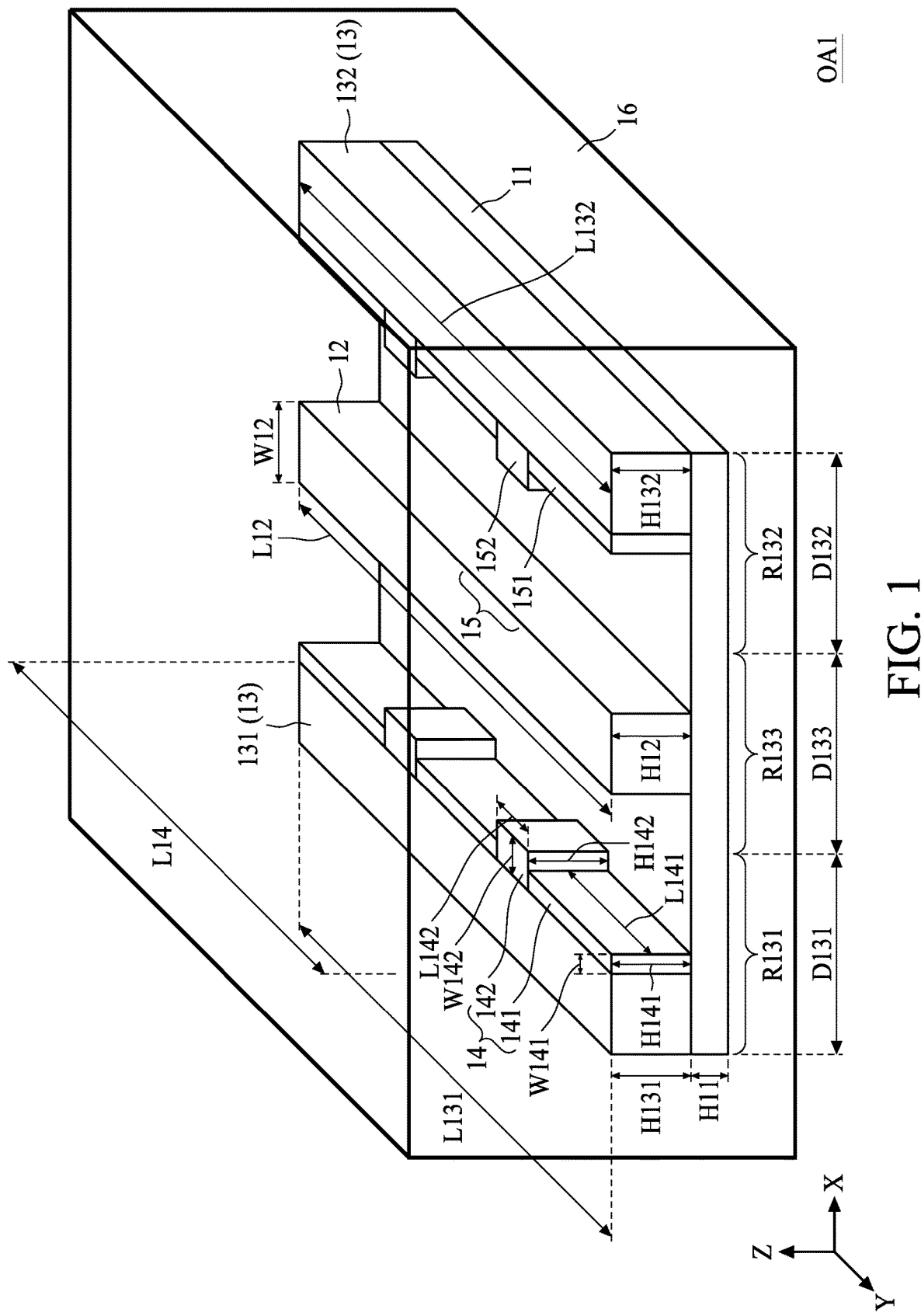
FIG. 1 is a schematic 3D diagram of an optical attenuating structure in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

A variable optical attenuator (VOA) is widely used for wavelength-division-multiplexed (WDM) optical system for equalization of signals. A laser signal may pass through a splitter to generate a plurality of optical signals with different wavelength, and the VOA is to equalize the optical signals by providing large attenuation to make allowable optical power level. The VOA is also proved at the receiver site before the signals are transmitted to an optical detector and converting into electrical signals. A VOA includes a forwarded p-i-n junction structure, and a forwarded bias voltage is provided to create an optical loss for better equalization. Free carriers in a waveguide of the VOA result in current-controlled variable attenuation when applying the forwarded bias voltage, however, it results in high injection current and large power consumption in order to achieve a default optical loss (e.g. greater than 30 dB of optical loss) to a certain wavelength (or a certain range of wavelength).

The present disclosure provides a VOA structure including an optical attenuating member in order to achieve the default optical loss with lower power consumption. The optical signal is affected by the surrounding environment, and thus the optical attenuating member is designed to be formed adjacent to the waveguide to provide optical loss of a target wavelength (or a target range of wavelengths). Some optical loss of the default optical loss is attributed to the optical attenuating member, and thus the same default optical loss required on the target wavelength (or the target range of wavelengths) can be achieved by a lower power consumption. The present disclosure may also include a heater to adjust a phase of a wavelength in order to further tuning the target wavelength and a performance of the VOA structure.

FIG. 1 shows an optical attenuating structure OA1 in accordance with some embodiments of the present disclosure. The optical attenuating structure OA1 includes a substrate 11, a waveguide 12 and doping regions 13. In some embodiments, the substrate 11 is a semiconductive substrate. In some embodiments, the substrate 11 includes an elementary semiconductive substrate, such as silicon or germanium; a compound semiconductor substrate, such as silicon germanium, silicon carbide, gallium arsenic, gallium phosphide, indium phosphide, or indium arsenide; or combinations thereof. In some embodiments, the waveguide 12 includes same or similar material to a material of the substrate 11. In some embodiments, a sum of a height H12 of the waveguide 12 and a height H11 of the substrate 11 can be adjusted according to different bands of different applications, wherein the height H12 and the height H11 are measured along a Z direction. In some embodiments, the sum of the height H12 and the height H11 is in a range of 100 nm-500 nm. In some embodiments, the sum of the height H12 and the height H11 is in a range of 200 nm-300 nm. In some embodiments, a width W12 of the waveguide 12 is in a range of 250 nm-2 um, wherein the width W12 is measured along an X direction or an extending direction of the substrate 11. In some embodiments, the width W12 is in a range of 300 nm-500 nm. A length L12 of the waveguide 12 measured along a Y direction or a longitudinal direction of the waveguide 12 depends on a distance for propagation of the optical signal, and it is not limited herein.

The doping regions 13 are disposed over the substrate 11. The doping regions 13 include a first doping region R131 and a second doping region R132. The second doping region R132 is opposite to the first doping region R131 and separated from the first doping region R131 by the waveguide 12. The first doping region R131 includes a first type of dopants and the second doping region R132 includes a second type of dopants different from the first type of dopants. In some embodiments, the first doping region R131 is a P-type doping region (or a positive region of the doping regions 13), and the second doping region R132 is an N-type doping region (or a negative region of the doping regions 13). In some embodiments, the first doping region R131 is an N-type doping region (or a negative region), and the second doping region R132 is a P-type doping region (or a positive region).

An intrinsic region R133 of the doping regions 13 is defined by the first doping region R131 and the second doping region R132. The intrinsic region R133 is disposed between the first doping region R131 and the second doping region R132 to form a core region. When a forward bias voltage is applied to the doping regions 13, free carriers in the first doping regions R131 and the second doping region R132 are forced and injected into the core region (i.e. the intrinsic region R133). The injected free carriers then absorb light in the waveguide 12, resulting in optical attenuation. The waveguide 12 is disposed in the intrinsic region R133. A dimension D133 of the intrinsic region R133, which is measured as a distance D133 between the first doping region R131 and the second doping region R132 along an extending direction of the substrate 11 (i.e. X direction in the embodiments of FIG. 1), depends on different requirements or devices, and it is not limited herein. In addition, a dimension D131 of the first doping region R131 and a dimension D132 of the second doping region R132 can be adjusted depending on different requirements or devices, and they are not limited herein, wherein the dimension D131 and the dimension D132 are measured along the extending direction of the substrate 11 of the X direction.

The dimension D131 and the dimension D132 can be substantially the same or different according to different applications. In some embodiments, the first doping region R131 includes different doping concentrations. In some embodiments, a first portion of the first doping region R131 covering a first electrode 131 has a higher doping concentration than that of a second portion of the first doping region R131 proximal to the intrinsic region R133. In some embodiments, a first portion of the second doping region R132 covering a second electrode 132 has a higher doping concentration than that of a second portion of the second doping region R132 proximal to the intrinsic region R133. In some embodiments, the first portion of the first doping region R131 and the first portion of the second doping region R132 respectively are greater than 1e20 atoms/cm$^3$. In some embodiments, the second portion of the first doping region R131 and the second portion of the second doping region R132 respectively are in a range of 1e16-1e21 atoms/cm$^3$ for a better performance of attenuation. In some embodiments, the second portion of the first doping region R131 and the second portion of the second doping region R132 respectively are in a range of 1e17-1e18 atoms/cm³ for a greater signal loss. A higher doping concentration can provide greater signal loss but with greater power consumption and insertion loss as a tradeoff. Therefore, the doping concentrations of the first and second portions of the first doping region R131 and the first and second portions of the second doping region R132 respectively can be adjusted according to different applications and requirements. In some embodiments, for a purpose of better performance of attenuation, a ratio of the doping concentrations between the first doping region R131 and the second doping region R132 is in a range of 1 to 100, wherein the P-type doping concentration is equal to or higher than the N-type doping concentration. In some embodiments, the ratio of P-type doping concentration to the N-type doping concentration is in a range of 1 to 10. Different regions of the first doping region R131 and the second doping region R132 with different concentrations are not shown in FIG. 1 but will be further illustrated in the following description accompanying with figures.

The first electrode 131 is disposed over the substrate 11 and in the first doping region R131. The second electrode is disposed over the substrate 11 and in the second doping region R132. The first electrode 131 and the second electrode 132 are extended along the substrate 11. In some embodiments, the first electrode 131, the second electrode 132 and the waveguide 142 are extended along the same direction (e.g. Y direction). In some embodiments, the first electrode 131, the second electrode 132 and the waveguide 142 are substantially parallel to each other. In some embodiments, a height H131 of the first electrode 131 and a height H132 of the second electrode 132 respectively are substantially equal to the height H12 of the waveguide 12, wherein the height H131 and the height H132 are measured along the Y direction. A length L131 of the first electrode 131 and a length L132 of the second electrode 132, which are measured along the Y direction, are substantially equal to the length L12 of the waveguide 12.

The optical attenuating structure OA1 further includes a first optical attenuating member 14 and a second optical attenuating member 15. The first optical attenuating member 14 and the second optical attenuating member 15 are coupled with the waveguide 12. The first optical attenuating member 14 is disposed over the substrate 11 and between the waveguide 12 and the first electrode 131. The second optical attenuating member 15 is disposed over the substrate 11 and between the waveguide 12 and the second electrode 132. In some embodiments, the first optical attenuating member 14 is disposed in the first doping region R131. In some embodiments, the second optical attenuating member 15 is disposed in the second doping region R132.

The first optical attenuating member 14 and the second optical attenuating member 15 can affect optical signals transmitted in the optical attenuating structure OA1. In some embodiments, the optical attenuating structure OA1 can include only one of the first optical attenuating member 14 and the second optical attenuating member 15. In some embodiments, due to symmetrical pattern of a wavelength, the first optical attenuating member 14 and the second optical attenuating member 15 are symmetrically disposed with respect to the waveguide 12. Configurations of the first optical attenuating member 14 and the second optical attenuating member 15 are not limited herein as long as a structural difference facing the waveguide 12 is present.

In the embodiment of FIG. 1, the first optical attenuating member 14 includes a first portion 141 and a second portion 142. The first portion 141 and the second portion 142 are arranged alternately along a longitudinal direction (e.g. the Y direction) of the first electrode 13. A height H141 of the first portion 141 is substantially equal to a height H142 of the second portion 142, wherein the height H141 and the height H142 are measured above the substrate and along the Z direction, or a direction substantially perpendicular to the extending direction of the substrate 11 and the longitudinal direction of the first electrode 131. In the embodiment of FIG. 1, the height H141 and the height H142 are substantially equal to the height H131, the height H132 and/or the height H12.

In the embodiment of FIG. 1, a width W141 of the first portion 141 and a width W142 of the second portion 142 are different, and thus the first optical attenuating member 14 can provide signal loss even the height H131 and the height H132 are substantially the same. As shown in FIG. 1, the width W141 of the first portion 141 is less than the width W142 of the second portion 142 of the first optical attenuating member 14, wherein the width W141 and the width W142 are measured along the X direction. In other embodiments, the width W141 of the first portion 141 can be greater than the width W142 of the second portion 142, and it is not limited herein. A length L141 of the first portion and a length L142 of the second portion can be substantially equal or different, wherein the length L141 and the length L142 are measured along the Y direction or the longitudinal direction of the first electrode 131. In the embodiments of FIG. 1, the length L141 is greater than the length L142 for a purpose of illustration but not a limitation.

The first optical attenuating member 14 can include one or more portions. FIG. 1 shows two portions 141 and 142 are for illustration only. Lengths, widths, and heights of different portions of the first optical attenuating member 14 are adjusted according to different target wavelengths for attenuation. In some embodiments, the first optical attenuating member 14 includes more than two different portions alternately arranged along the Y direction. In some embodiments, the first optical attenuating member 14 includes only the first portion 141 or the second portion 142.

A length L14 of the first optical attenuating member 14 can be adjusted depending on a target signal loss by the first optical attenuating member 14. The length L14 is measured along the Y direction between two edges of the first optical attenuating member 14, the length L14 can also be understood as a total length of the first optical attenuating member 14. In the embodiments of FIG. 1, the length L14 is substantially equal to the length L131 of the first electrode 131 of the length L12 of the waveguide 12. In other embodiments, the length L14 is less than the length L131 of the first electrode 131 of the length L12 of the waveguide 12. A greater length L14 of the first optical attenuating member 14 provide a greater signal loss.

In some embodiments, the second optical attenuating member 15 and the first optical attenuating member 14 are symmetrical with respect to the waveguide 12. In the embodiments of FIG. 1, a first portion 151 of the second optical attenuating member 15 is substantially identical to the first portion 141 of the first optical attenuating member 14, and a second portion 152 of the second optical attenuating member 15 is substantially identical to the second portion 142 of the first optical attenuating member 14. Thus, a detailed configuration of the second optical attenuating member 15 is not repeated herein. In addition, it should be noted that the substrate 11, the waveguide 12, the first electrode 131, the second electrode 132, the first portion 141 and the second portion 142 of the first optical attenuating member 14, and the first portion 151 and the second portion 152 of the second optical attenuating member 15 are illustrated as individual features in FIG. 1, but it is for a purpose of illustration. In some embodiments, two or more of the waveguide 12, the first electrode 131, the second electrode 132, the first portion 141 and the second portion 142 of the first optical attenuating member 14, and the first portion 151 and the second portion 152 of the second optical attenuating member 15 can be monolithic The optical attenuating structure OA1 further includes a dielectric layer 16 disposed over the substrate 11 and covering the waveguide 12, the doping regions 13, the first optical attenuating member 14 and the second optical attenuating member 15. The dielectric layer 16 may be further disposed under the substrate 11 to surround the entire substrate 11. In some embodiments, the dielectric layer includes one or more of silicon oxide (SiOx), germanium oxide (GeOx), silicon nitride (SiNx) and silicon oxynitride (SiON). In some embodiments, the dielectric layer 16 is disposed under an interconnect structure (not shown) for electrical path between the optical attenuating structure OA1 and exterior electrical devices. The interconnect structure can includes a plurality of inter-metal dielectric (IMD) layers and a plurality of layers of metal lines. In some embodiments, the dielectric layer 16 forms a portion of the plurality of inter-metal dielectric (IMD) layers of the interconnect structure.

Figure 2:
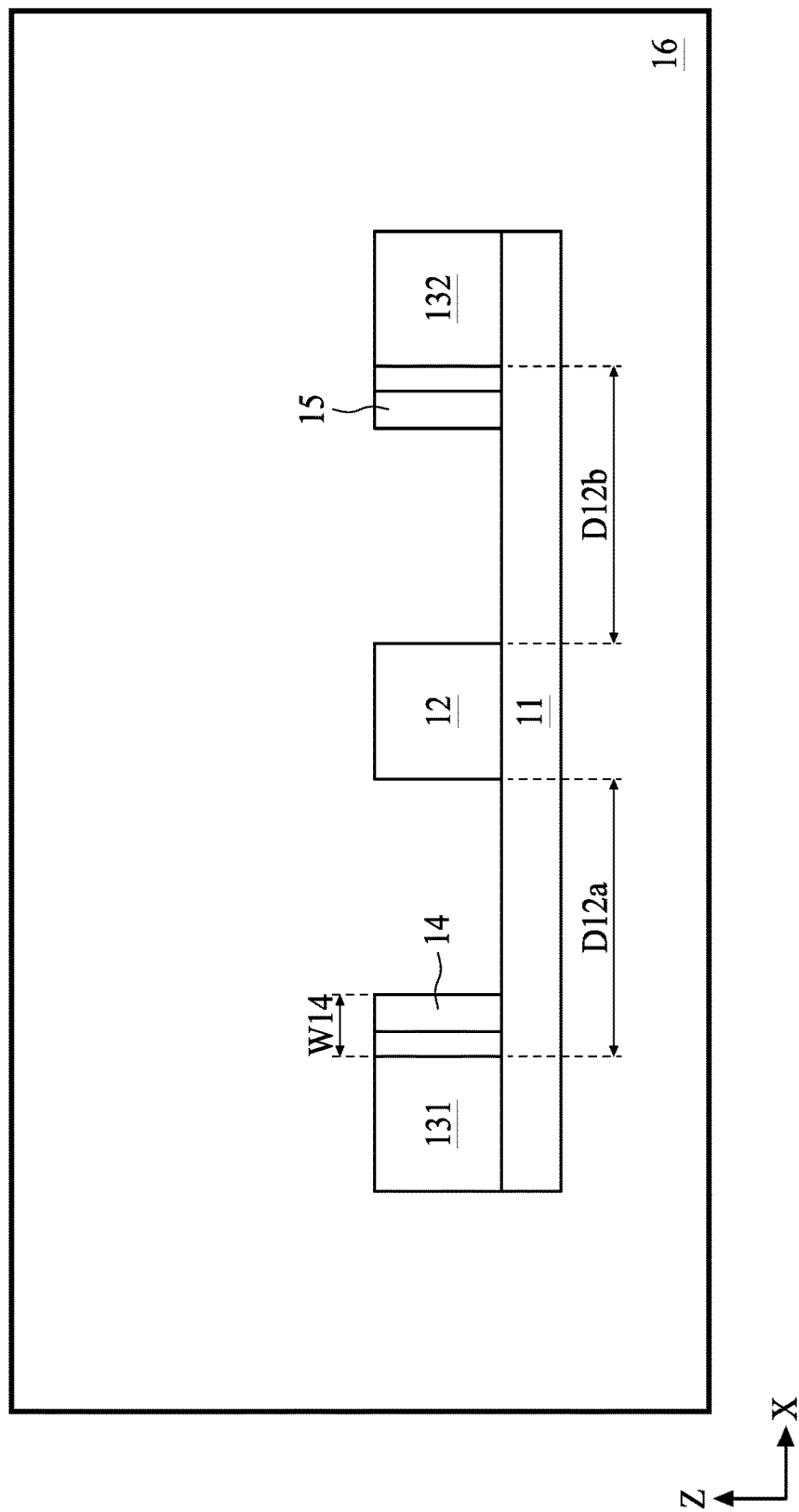
FIG. 2 is schematic side view of the optical attenuating structure of FIG. 1.

FIG. 2 is a side view of the optical attenuating structure OA1 of FIG. 1. A distance D12a between the waveguide 12 and the first electrode 131 is in a range of 500 nm-2 um, wherein the distance D12a is measured along the X direction. A trade-off between propagation loss and a bandwidth is adjusted to have a suitable value of the distance D12a. In some embodiments, a distance D12b between the waveguide 12 and the second electrode 132 is substantially equal to the distance D12a due to symmetrical arrangement of the first optical attenuating member 14 and the second optical attenuating member 15 with respect to the waveguide 12. A width W14 of the first optical attenuating member 14 is in a range of 5 nm-50 nm or $1/20 \sim 1/200$ of distance D12a, wherein the width W14 is measured along the X direction and can be understood as a total width (or a greatest width) of the first optical attenuating member 14.

In order to further illustrate concepts of the present disclosure, various embodiments are provided below. However, it is not intended to limit the present disclosure to specific embodiments. In addition, elements, conditions or parameters illustrated in different embodiments can be combined or modified to have different combinations of embodiments as long as the elements, parameters or conditions used are not conflicted. For ease of illustration, reference numerals with similar or same functions and properties are repeatedly used in different embodiments and figures, but it does not intend to limit the present disclosure into specific embodiments. For a purpose of brevity, only differences from other embodiments are emphasized in the following specification, and descriptions of similar or same elements, functions and properties are omitted.

Figure 3:
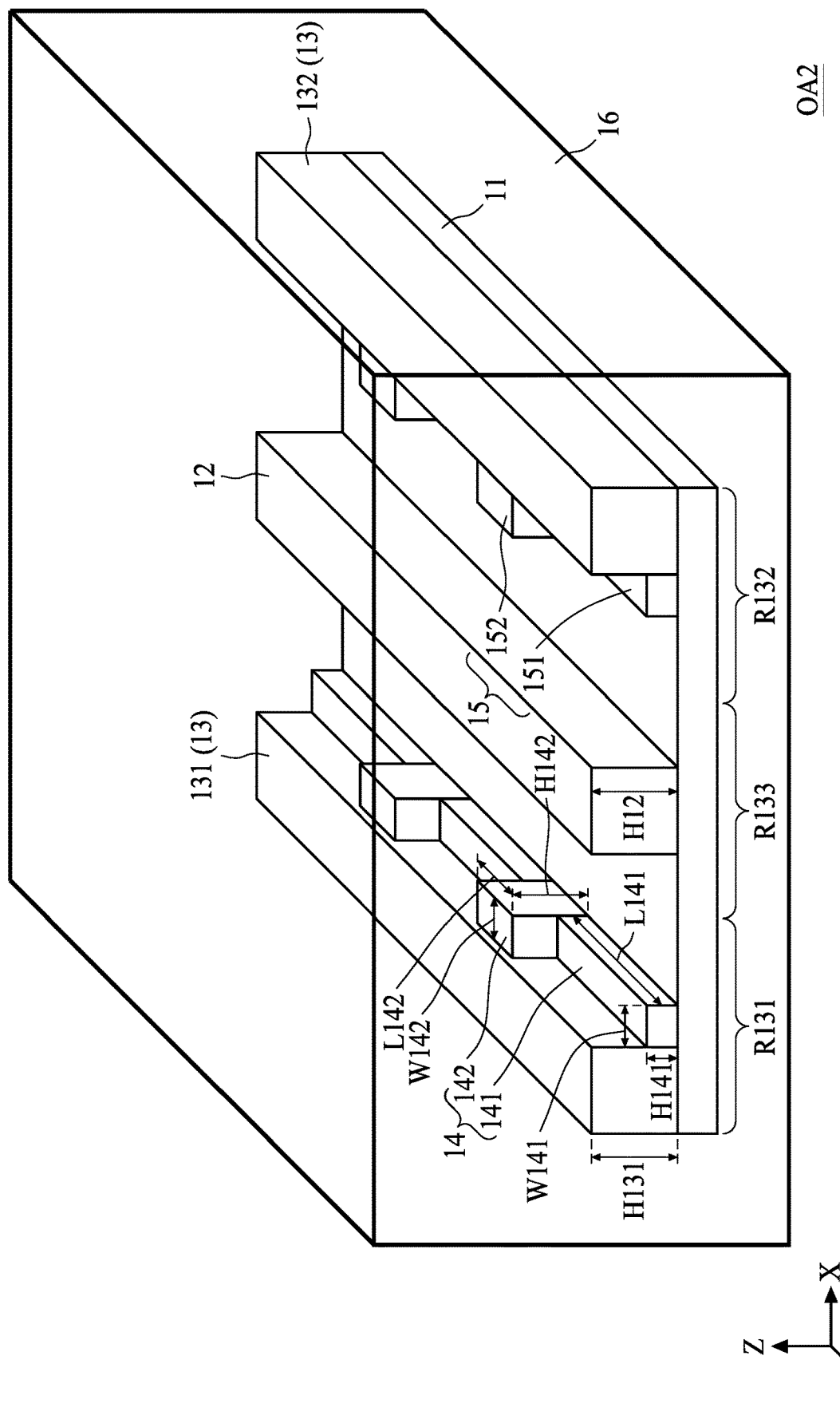
FIG. 3 is a schematic 3D diagram of an optical attenuating structure in accordance with some embodiments of the present disclosure.
Figure 4:
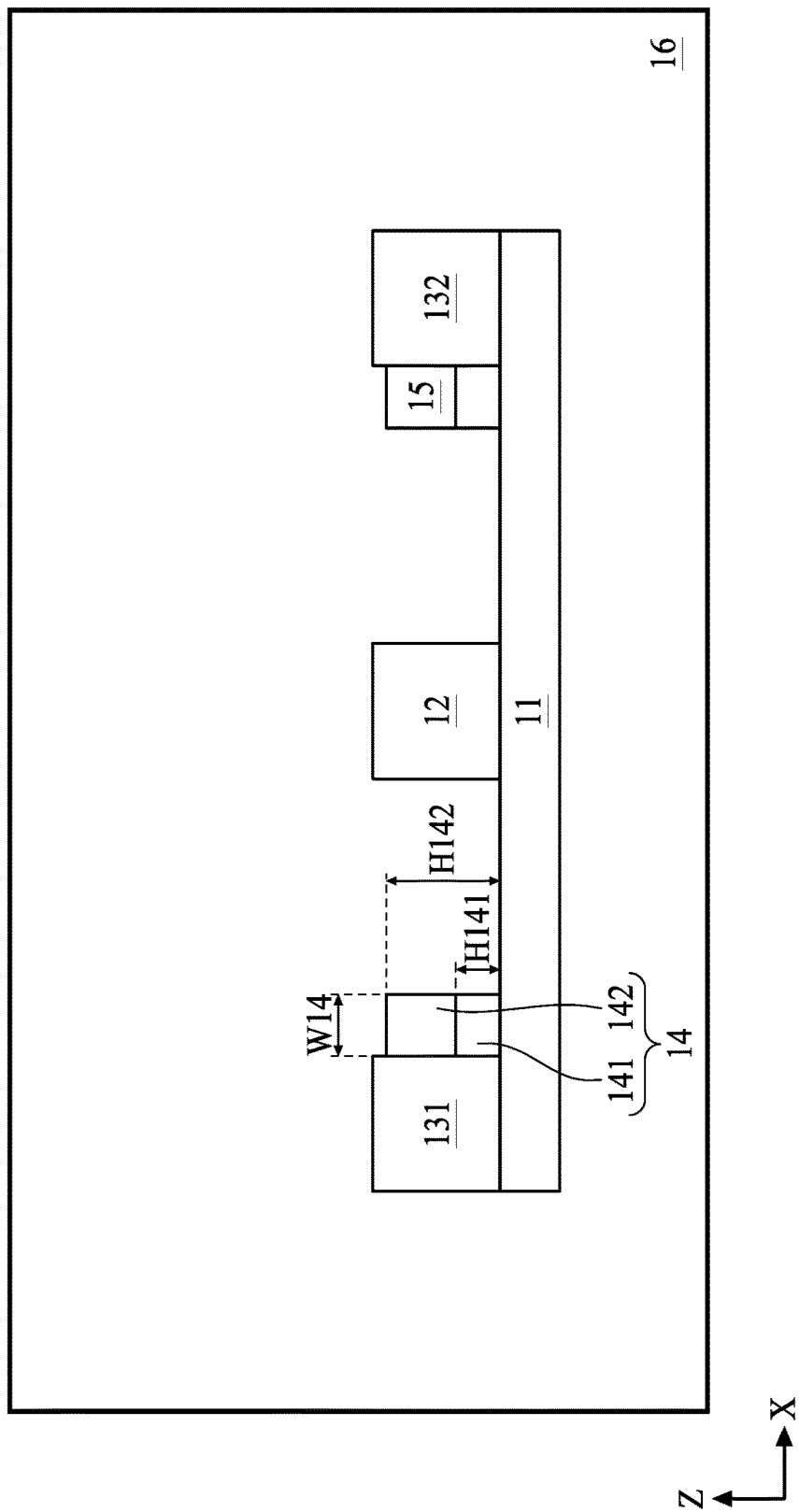
FIG. 4 is schematic side view of the optical attenuating structure of FIG. 3.

FIG. 3 shows an optical attenuating structure OA2 in accordance with some embodiments of the present disclosure. FIG. 4 is a side view of the optical attenuating structure OA2 as shown in FIG. 3. The optical attenuating structure OA2 includes different portions of the first optical attenuating member 14 having different heights. In the embodiments as shown in FIGS. 3-4, the second optical attenuating member 15 also includes different portions with different heights. In the embodiments, the width W14 of the first optical attenuating member 14 is consistent along its length (e.g. the Y direction). In the embodiments, the width W141 of the first portion 141 and the width W142 of the second portion 142 of the first optical attenuating member 14 are substantially equal, and the height H141 of the first portion 141 is less than the height H142 of the second portion 142. In the embodiments shown in FIGS. 3-4, the height H142 of the second portion 142 is also less than the height H131 of the first electrode 131 or the height H12 of the waveguide 12. However, in other embodiments, the height H142 of the second portion 142 can be substantially equal to the height H131 of the first electrode 131 or the height H12 of the waveguide 12.

Figure 5:
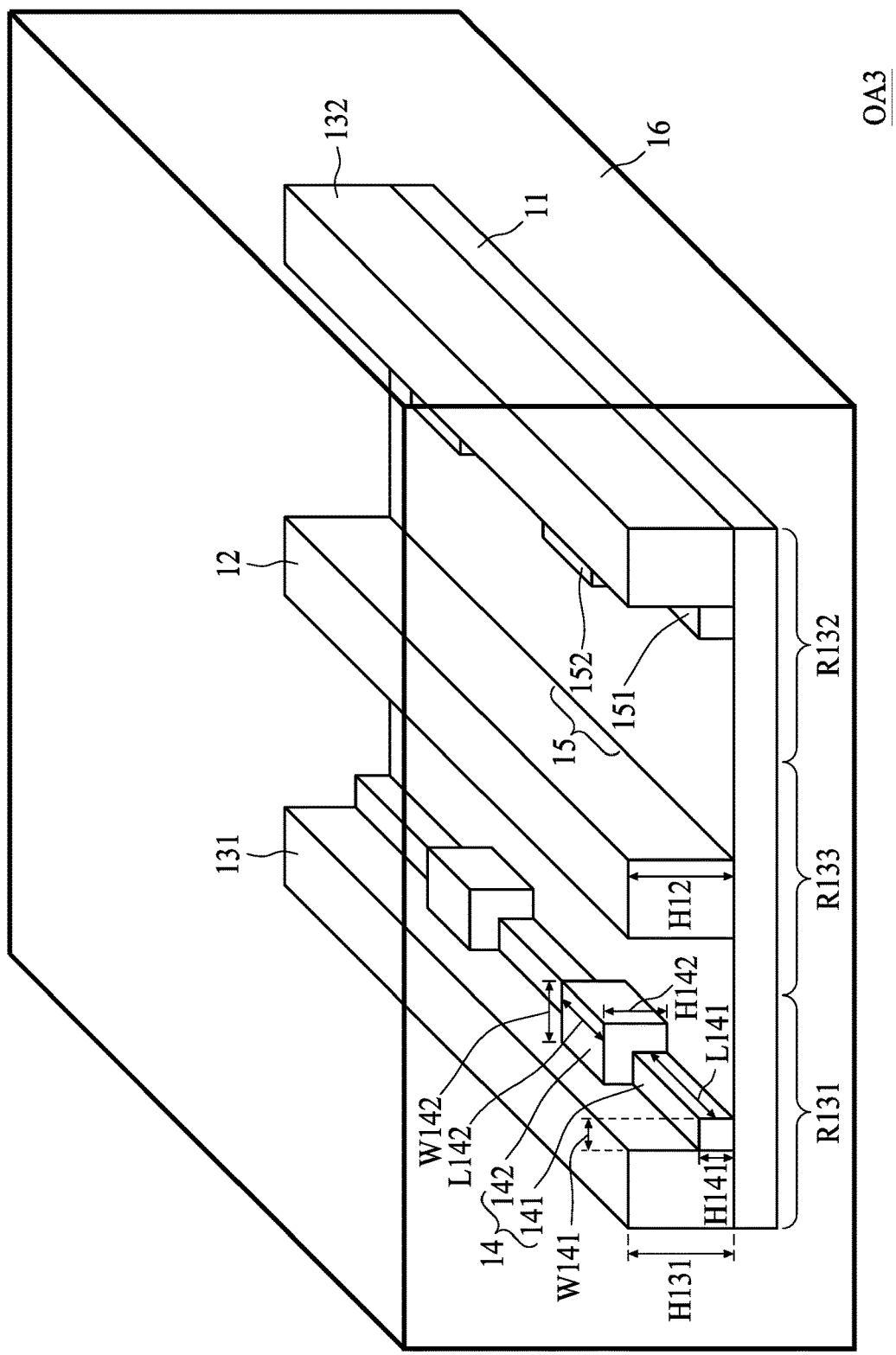
FIG. 5 is a schematic 3D diagram of an optical attenuating structure in accordance with some embodiments of the present disclosure.
Figure 6:
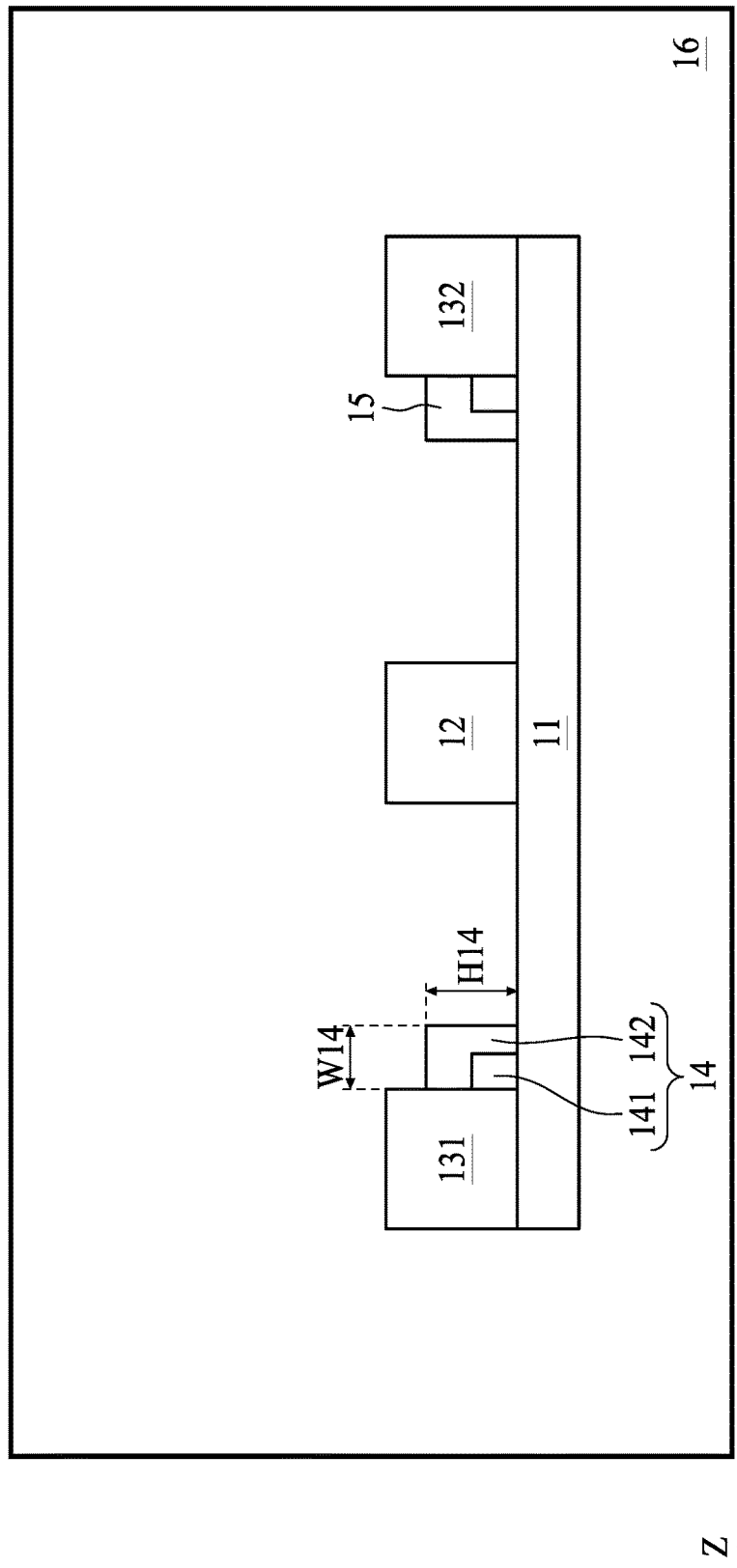
FIG. 6 is schematic side view of the optical attenuating structure of FIG. 5.

FIG. 5 shows an optical attenuating structure OA3 in accordance with some embodiments of the present disclosure. FIG. 6 is a side view of the optical attenuating structure OA3 as shown in FIG. 5. The optical attenuating structure OA3 includes different portions of the first optical attenuating member 14 having different heights and different widths. In the embodiments as shown in FIGS. 5-6, the second optical attenuating member 15 also includes different portions with different heights and different widths. The width W141 of the first portion 141 is less than the width W142 of the second portion 142 of the first optical attenuating member 14, and the height H141 of the first portion 141 is also less than the height H142 of the second portion 142. In the embodiments shown in FIGS. 5-6, the height H141 of the first portion 141 and the height H142 of the second portion 142 are both less than the height H131 of the first electrode 131 or the height H12 of the waveguide 12. In other words, a height H14 of the first optical attenuating member 14 is less than the height H12 of the waveguide, wherein the height H14 is measured along the Y direction and can be understood as a total height (or a greatest height) of the first optical attenuating member 14. However, in other embodiments, the height H142 of the second portion 142 can be substantially equal to the height H131 of the first electrode 131 or the height H12 of the waveguide 12. In the embodiments, the width W14 of the first optical attenuating member 14 is substantially equal to width W142 of the second portion 142.

Figure 7:
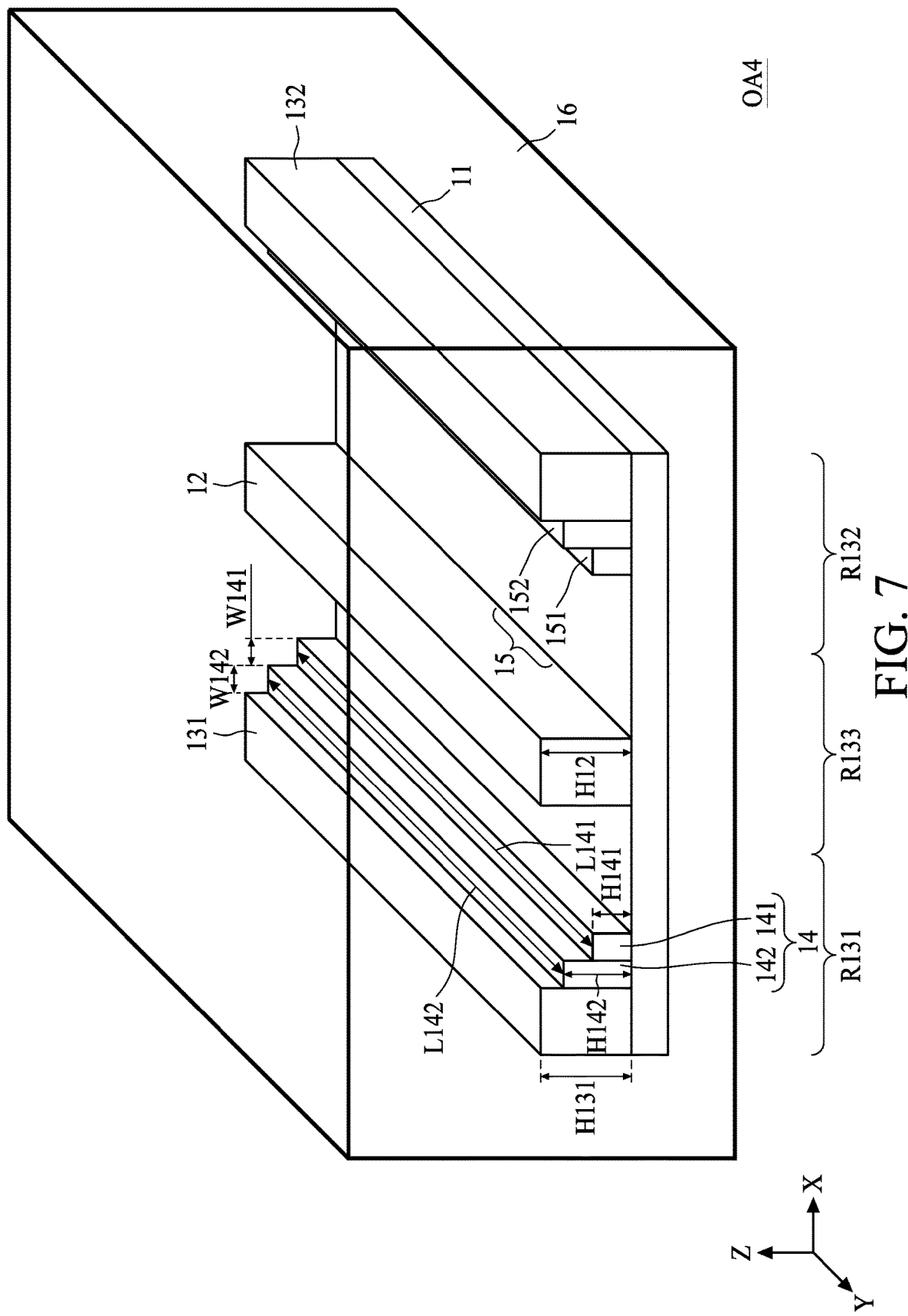
FIG. 7 is a schematic 3D diagram of an optical attenuating structure in accordance with some embodiments of the present disclosure.
Figure 8:
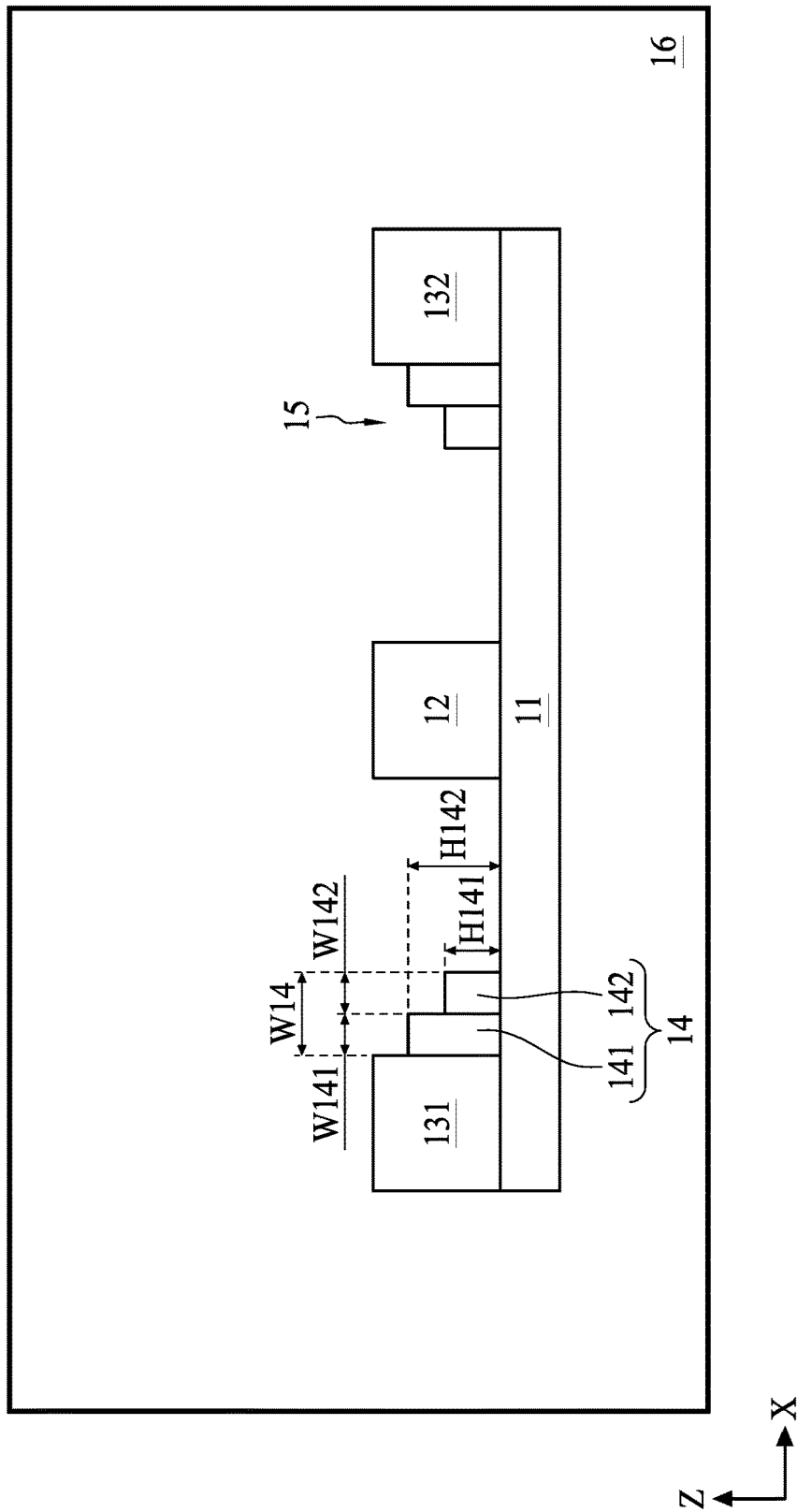
FIG. 8 is schematic side view of the optical attenuating structure of FIG. 7.

FIG. 7 shows an optical attenuating structure OA4 in accordance with some embodiments of the present disclosure. FIG. 8 is a side view of the optical attenuating structure OA4 as shown in FIG. 7. The optical attenuating structure OA4 also includes different portions of the first optical attenuating member 14 having different heights along its width (e.g. the X direction). The first portion 141 is disposed proximal to the waveguide 12, and the second portion 142 is disposed proximal to the first electrode 131. In the embodiments, the first portion 141 is in contact with the second portion 142. The height H141 of the first portion 141 and the height H142 of the second portion 142 are both less than the height H131 of the first electrode 131 or the height H12 of the waveguide 12, and the height H141 of the first portion 141 is less than the height H142 of the second portion 142. Thus, the first portion 141 and the second portion 142 together define a stair configuration of the first optical attenuating member 14 having a height gradually decreased from the first electrode 131 toward the waveguide 12 along the X direction. Specific heights of each of first portion 141 and the second portion 142 are not limited herein. In the embodiments, the height H141 is about ⅓ of the height H131 of the first electrode 131, and the height H142 of the second portion 142 is about ⅔ of the height H131 of the first electrode 131. Due to the arrangement of the first portion 141 and the second portion 142, the width W14 of the first optical attenuating member 14 is equal to a sum of the width W141 and the width W142 in the embodiments. Each of the width W141 of the first portion 141 and the width W142 of the second portion 142 of the first optical attenuating member 14 is not limited herein. In the embodiments, the first width W141 and the width W142 are substantially equal to each other.

Figure 9:
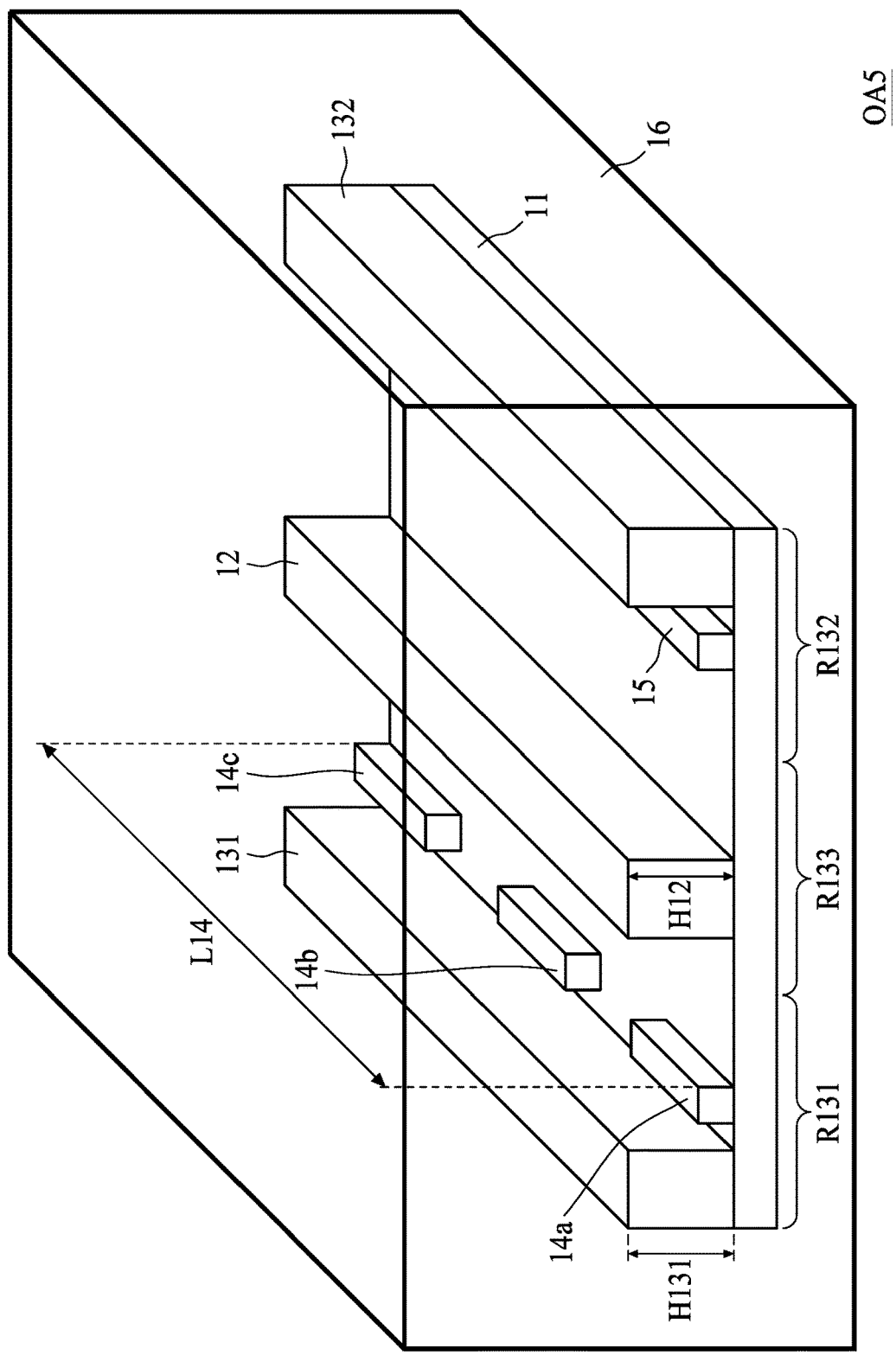
FIG. 9 is a schematic 3D diagram of an optical attenuating structure in accordance with some embodiments of the present disclosure.
Figure 10:
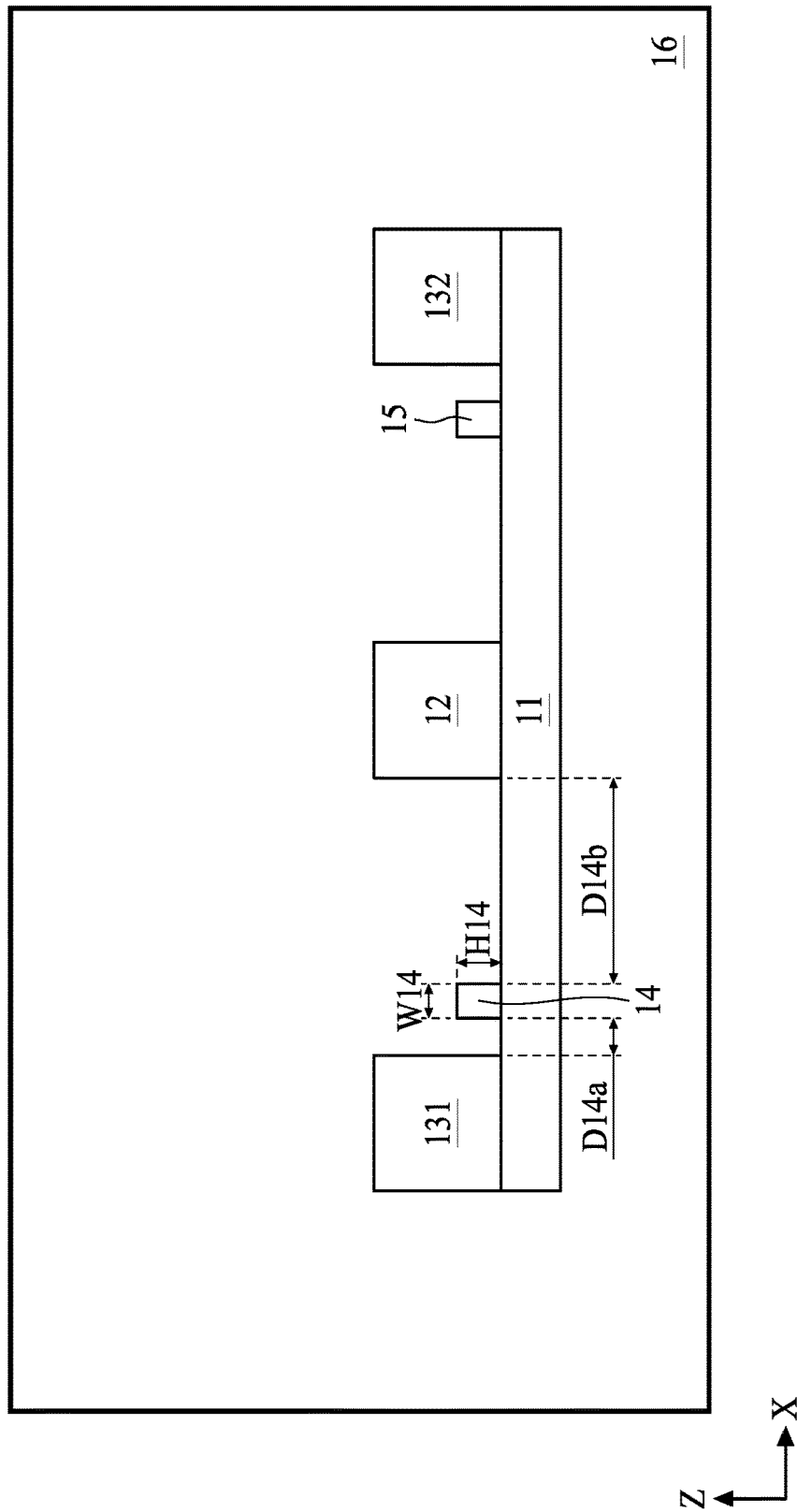
FIG. 10 is schematic side view of the optical attenuating structure of FIG. 9.

FIG. 9 shows an optical attenuating structure OA5 in accordance with some embodiments of the present disclosure. FIG. 10 is a side view of the optical attenuating structure OA5 as shown in FIG. 9. In the embodiments, the optical attenuating structure OA5 includes a plurality of portions 14a, 14b and 14c of the first optical attenuating member 14. The plurality of portions 14a, 14b and 14c are separately arranged along the Y direction or the longitudinal direction of the waveguide 12. In the embodiments, the portions 14a, 14b and 14c are substantially identical, but the present disclosure is not limited herein. In the embodiments, the first optical attenuating member 14 is separated from the waveguide 12 and the first electrode 131. A distance D14a between the first optical attenuating member 14 and the first electrode 131 and a distance D14b between the first optical attenuating member 14 and the waveguide 12 can be designed and adjusted according to different applications, and they are not limited herein. Similar to the illustration in other embodiments, the height H14, the width W14, a length of one portion of the first optical attenuating member 14, and the total length L14 of the first optical attenuating member 14 can be adjusted according to different target wavelengths and different target signal losses.

Therefore, the present disclosure provides an optical attenuating structure including an optical attenuating member in order to achieve a desired optical loss with lower power consumption. In order to ensure the optical loss being of a target wavelength, an optical attenuating structure of the present disclosure can include a heater to shift a phase of a wavelength for tuning the target wavelength. For a purpose of heat insulation, an optical attenuating structure of the present disclosure can also include one or more cavities adjacent to the waveguide of the optical attenuating structure.

Figure 11:
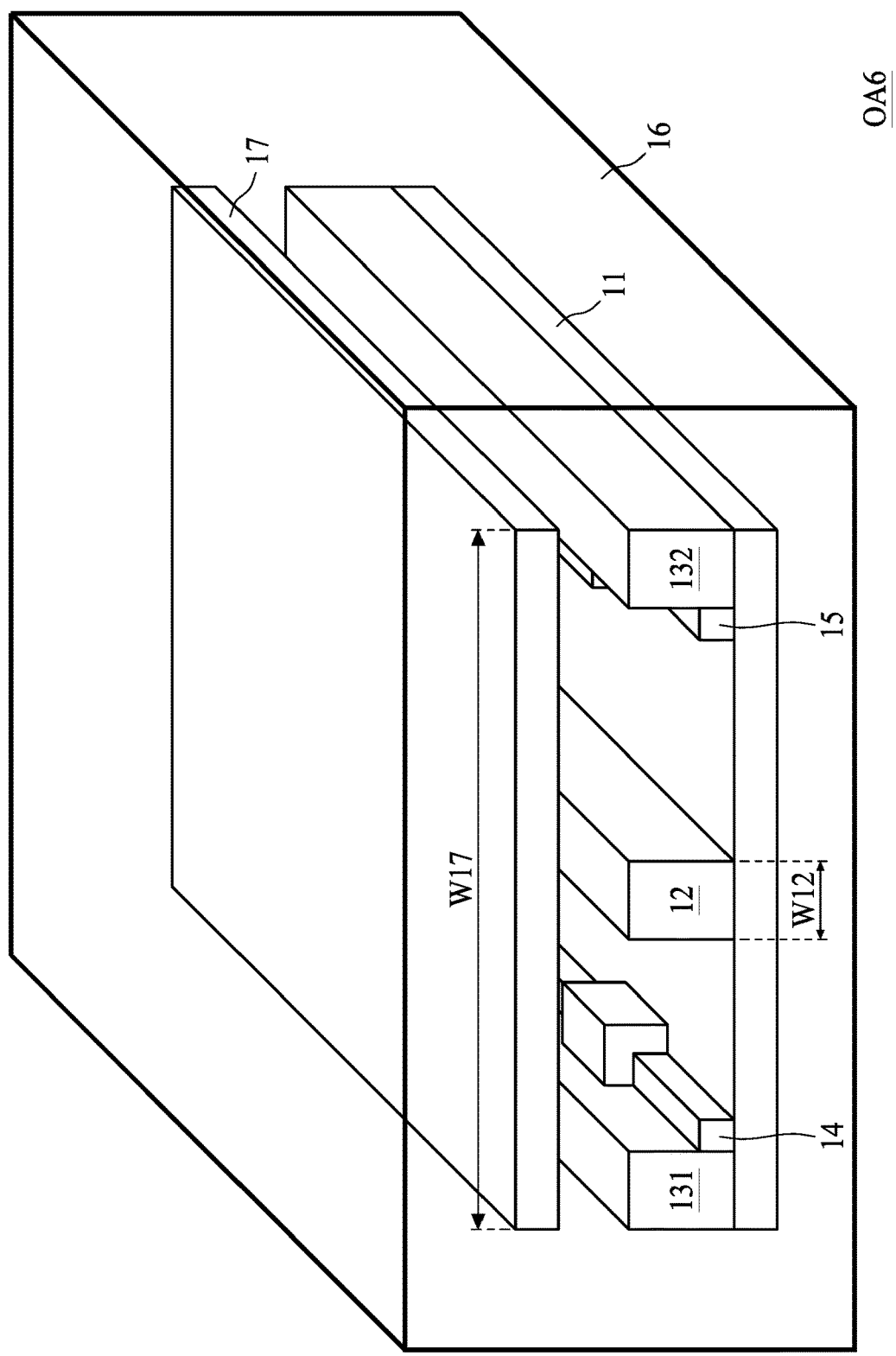
FIG. 11 is a schematic 3D diagram of an optical attenuating structure in accordance with some embodiments of the present disclosure.
Figure 12:
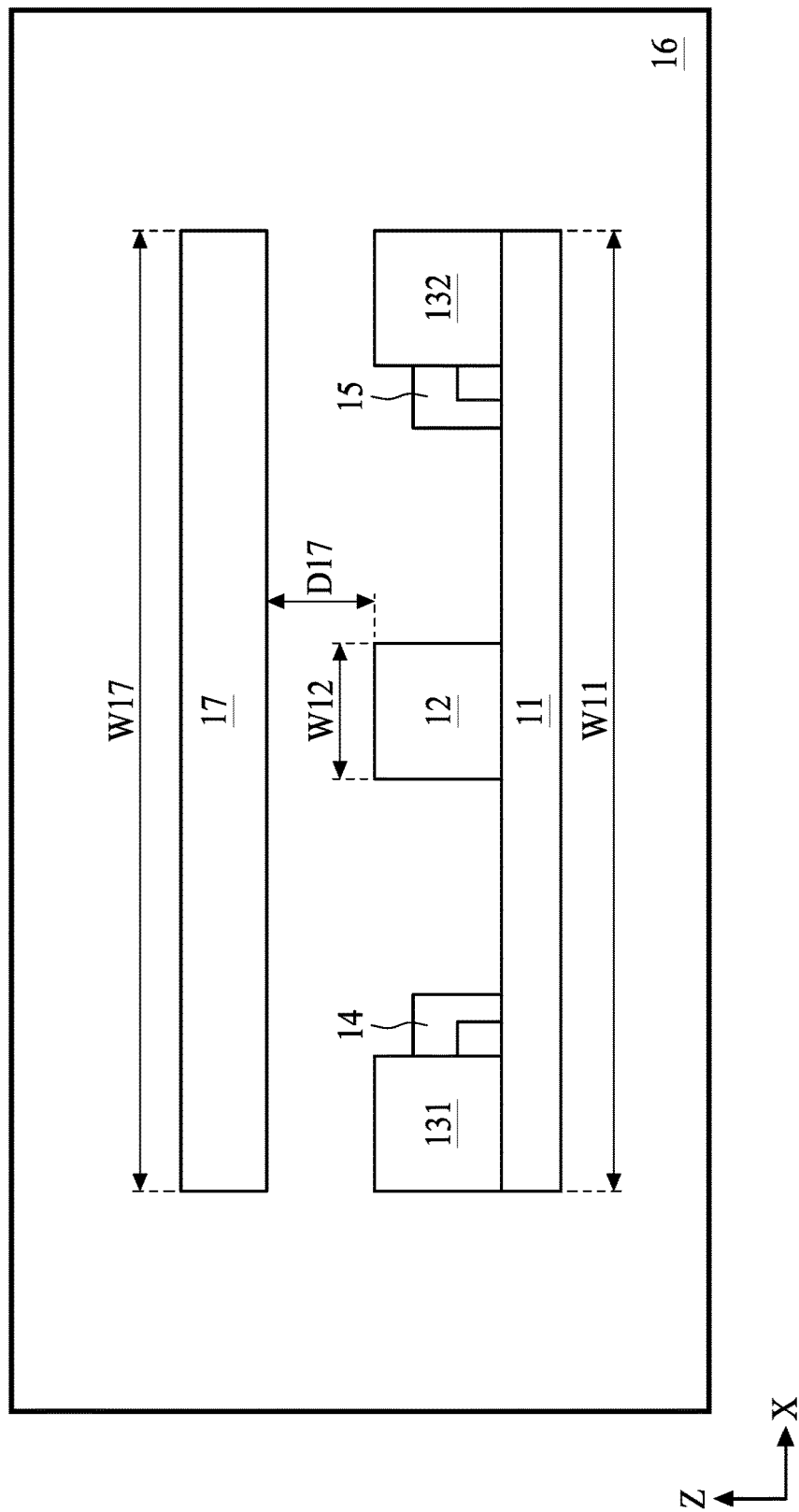
FIG. 12 is schematic side view of the optical attenuating structure of FIG. 11.

FIG. 11 shows an optical attenuating structure OA6 in accordance with some embodiments of the present disclosure. FIG. 12 is a side view of the optical attenuating structure OA6 as shown in FIG. 11. The optical attenuating structure OA6 is similar to the optical attenuating structure OA3 but further includes a heater 17 disposed over the waveguide 12. FIGS. 11-12 are for a purpose of illustration, and the heater 17 can be disposed in other optical attenuating structures similar to any of the optical attenuating structures OA1-OA5. The heater 17 is disposed in the dielectric layer 16 and separated from the waveguide 12 and the doping regions 13. In some embodiments, the heater 17 includes one or more metallic materials, such as titanium nitride (TiN), tantalum nitride (TaN), copper (Cu), aluminum (Al) and/or other suitable pure metal or metal-containing materials. The heater 17 at least vertically covers a portion of the waveguide 12 for a better heating efficiency. In some embodiments, the heater 17 vertically covers the entire waveguide 12. In some embodiments, a width W17 of the heater 17 is at least greater than the width W12 of the waveguide 12, wherein the width W17 is measured along the X direction. In some embodiments, the width W17 of the heater 17 is about two to five times of the width W12 of the waveguide 12. In the embodiments shown in FIGS. 11-12, the width W17 of the heater 17 is substantially the same as a width W11 of the substrate 11, wherein the width W11 is measured along the X direction or an extending direction of the substrate 11. In some embodiments, the heater 17 covers the entire doping regions 13 or the entire substrate 11. A distance D17 between the heater 17 and the waveguide 12 measured along the Z direction is in a range of 300 nm-500 nm. In some embodiments, the heater 17 can be formed in one or more of the IMD layers, and a thickness of the heater 17 measured along the Z direction depends on the thickness of the corresponding IMD layers.

As the semiconductor material of the waveguide 12 can be sensitive to the temperature, the distance D17 is controlled being equal to or greater than 300 nm to avoid unwanted signal loss due to a temperature change by the heater 17. For a purpose of heating efficiency, the distance D17 is controlled being equal to or less than 500 nm to avoid unwanted heat loss and extra power consumption for operating the heater 17.

Figure 13:
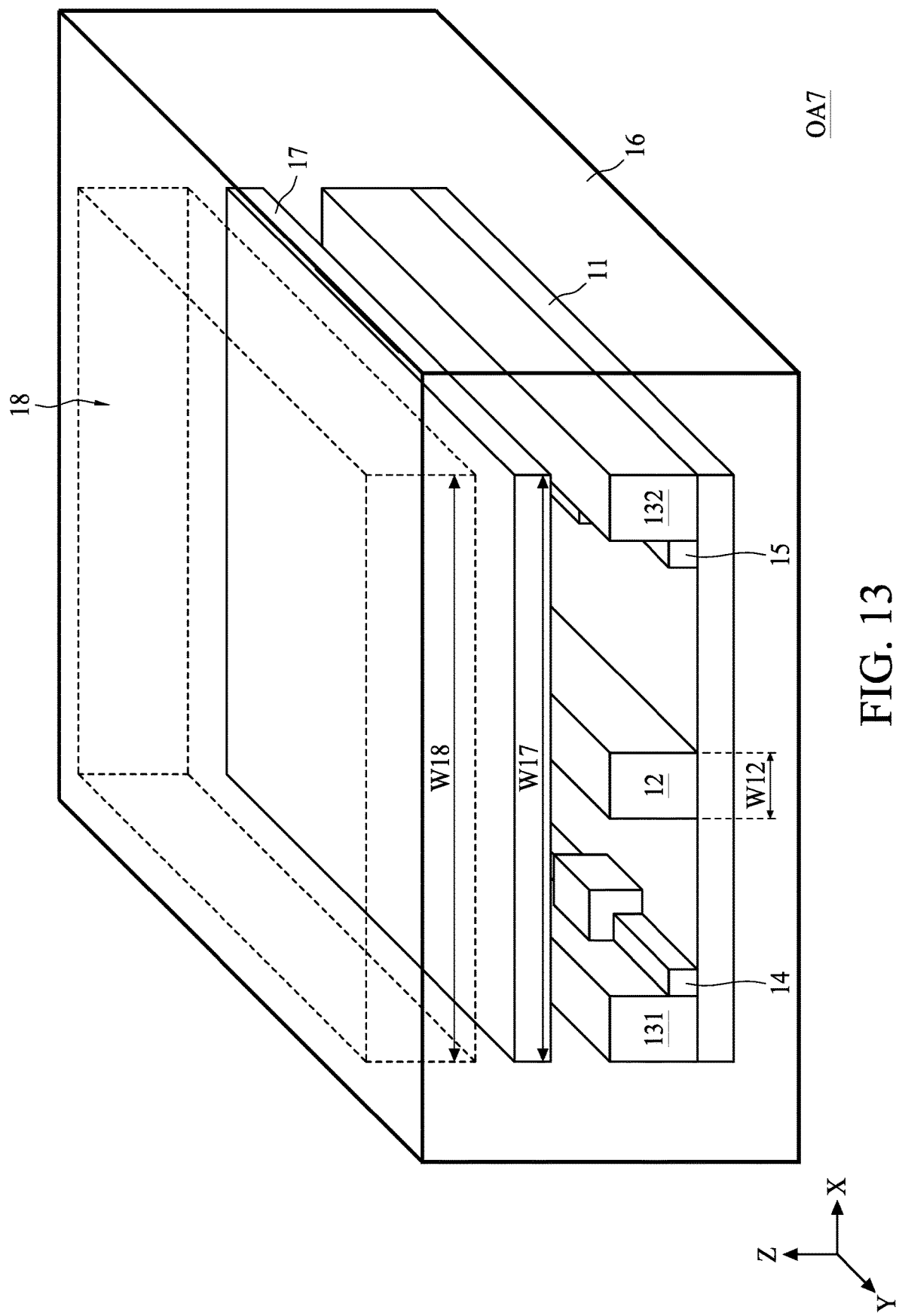
FIG. 13 is a schematic 3D diagram of an optical attenuating structure in accordance with some embodiments of the present disclosure.
Figure 14:
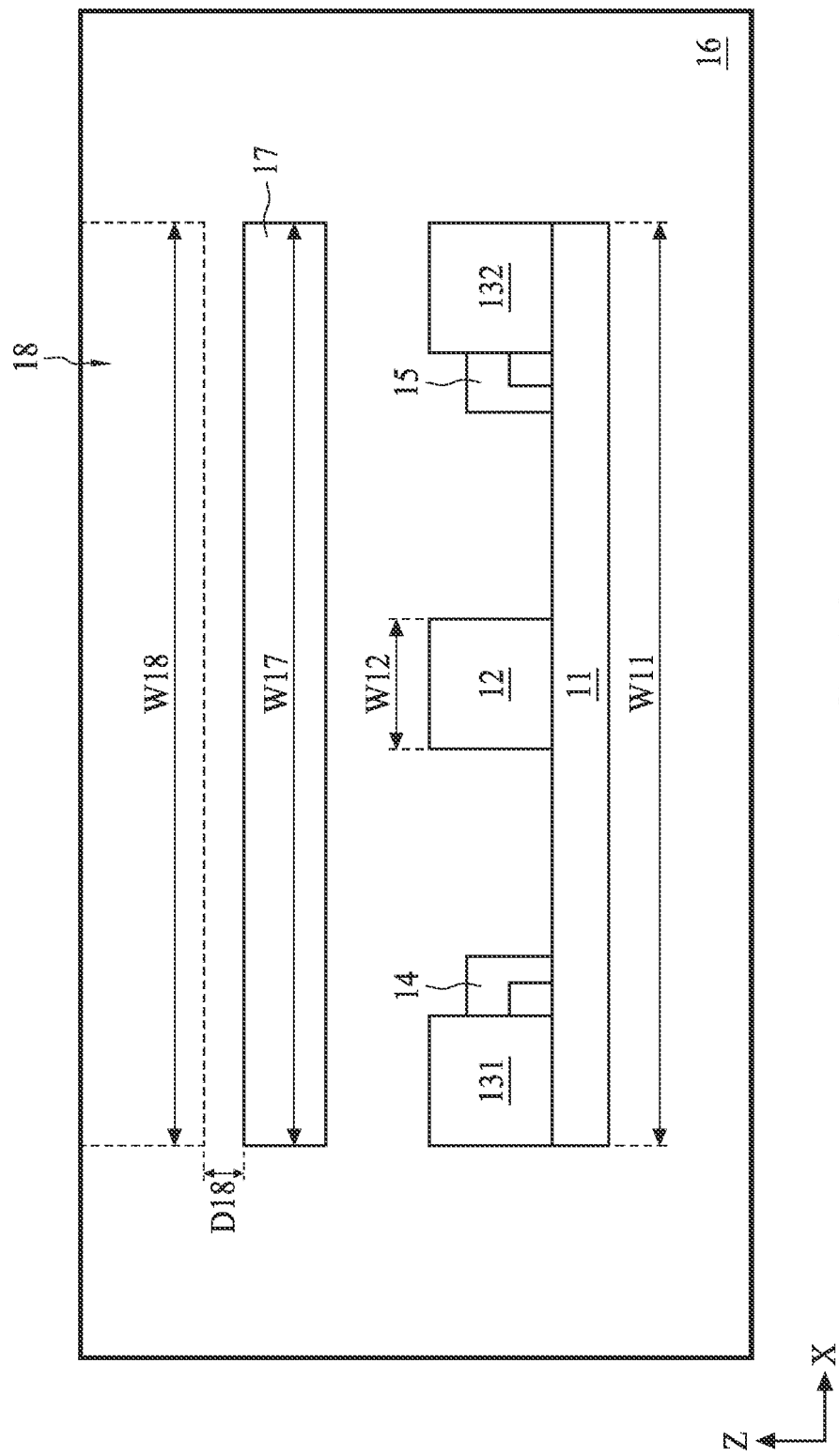
FIG. 14 is schematic side view of the optical attenuating structure of FIG. 13.

FIG. 13 shows an optical attenuating structure OA7 in accordance with some embodiments of the present disclosure. FIG. 14 is a side view of the optical attenuating structure OA7 as shown in FIG. 13. The optical attenuating structure OA7 is similar to the optical attenuating structure OA6 but further includes a first cavity 18 disposed over the heater 17 for heat isolation. The cavity is formed in the dielectric layer 16 and separated from the heater 17. The first cavity 18 at least vertically covers a portion of the heater 17 for a better heating isolation. In some embodiments, the first cavity 18 vertically covers the entire heater 17. In some embodiments, a width W18 of the first cavity 18 is at least greater than the width W12 of the waveguide 12, wherein the width W18 is measured along the X direction. In some embodiments, the width W18 of the heater 18 is about two to five times of the width W12 of the waveguide 12. In some embodiments, the width W18 of the first cavity 18 is at least substantially equal to or greater than the width W17 of the heater 17. In the embodiments shown in FIGS. 13-14, the width W18 of the first cavity 18 is substantially the same as a width W17 of the heater 17. A distance D18 between the first cavity 18 and the heater 17 measured along the Z direction is greater than zero. In some embodiments, the first cavity 18 and the heater 17 is separated by the dielectric layer 16 for preventing oxidation or damage to the heater 17 from the air or environment. In some embodiments, the first cavity 18 is filled with an air or a suitable gas.

Figure 15:
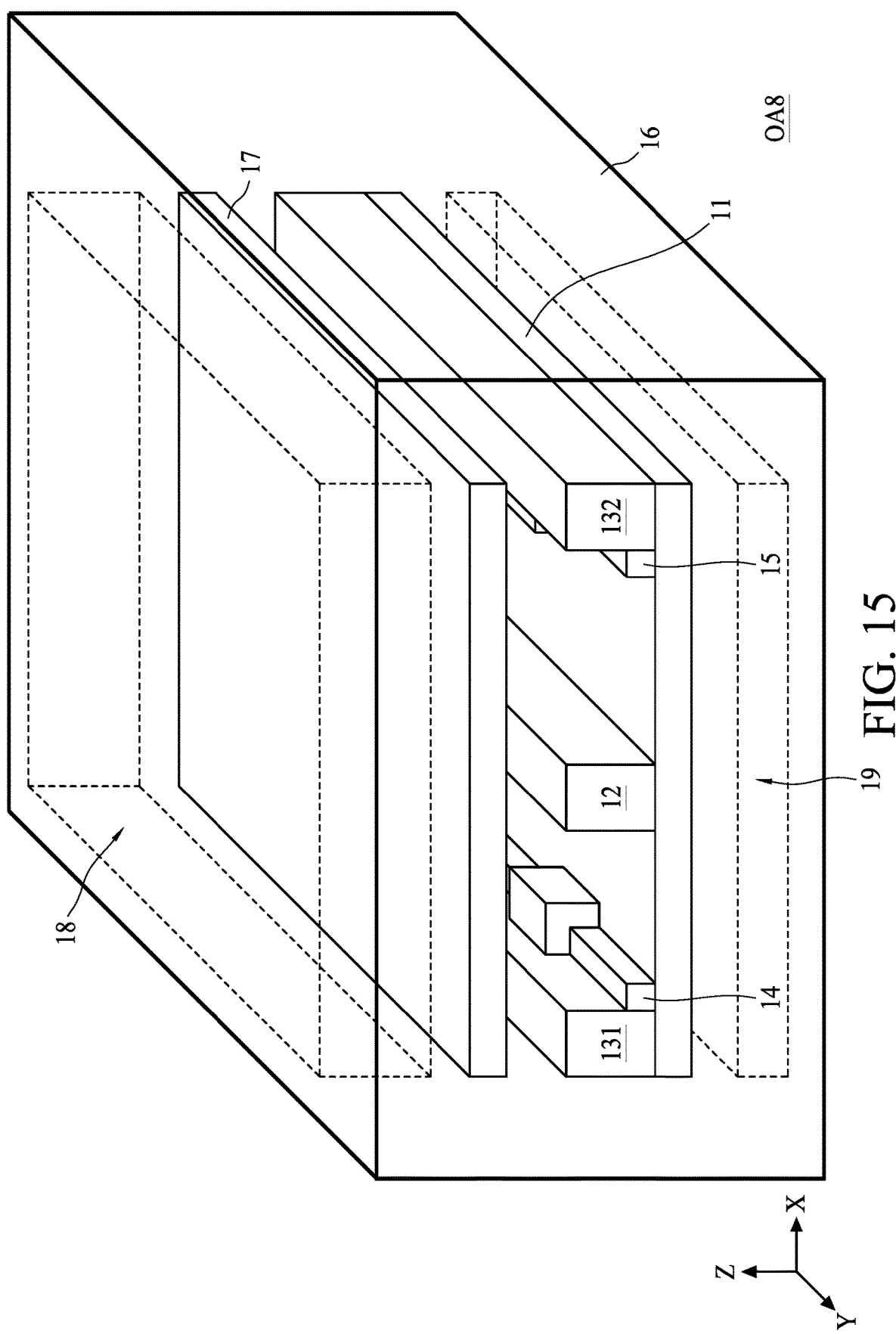
FIG. 15 is a schematic 3D diagram of an optical attenuating structure in accordance with some embodiments of the present disclosure.
Figure 16:
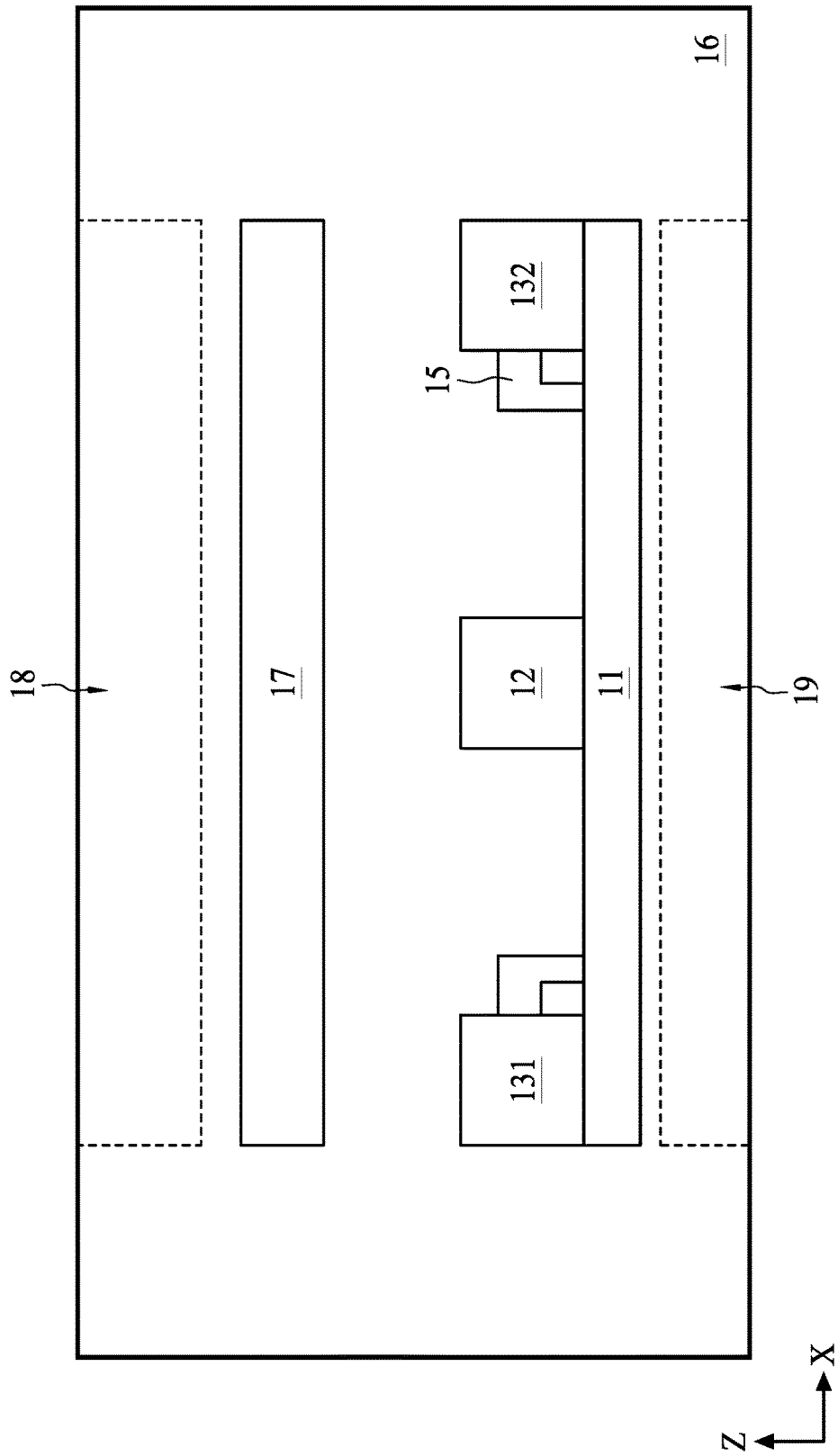
FIG. 16 is schematic side view of the optical attenuating structure of FIG. 15.

FIG. 15 shows an optical attenuating structure OA8 in accordance with some embodiments of the present disclosure. FIG. 16 is a side view of the optical attenuating structure OA8 as shown in FIG. 15. The optical attenuating structure OA8 is similar to the optical attenuating structure OA7 but further includes a second cavity 19 disposed under the substrate 11 for heat isolation. The second cavity 19 is disposed in the dielectric layer 16 and separated from the substrate 11. The substrate 11 is encapsulated by the dielectric layer 16 for protection of the substrate 11. Parameters of the second cavity 19 can be similar to the first cavity 18 as illustrated in FIGS. 13-14, and repeated description is omitted herein. In the embodiments, the optical attenuating structure OA8 includes both the upper first cavity 18 and the lower second cavity 19 for better heat isolation. In some embodiments, only the lower second cavity 19 is included and enough for the required heat isolation.

Figure 17:
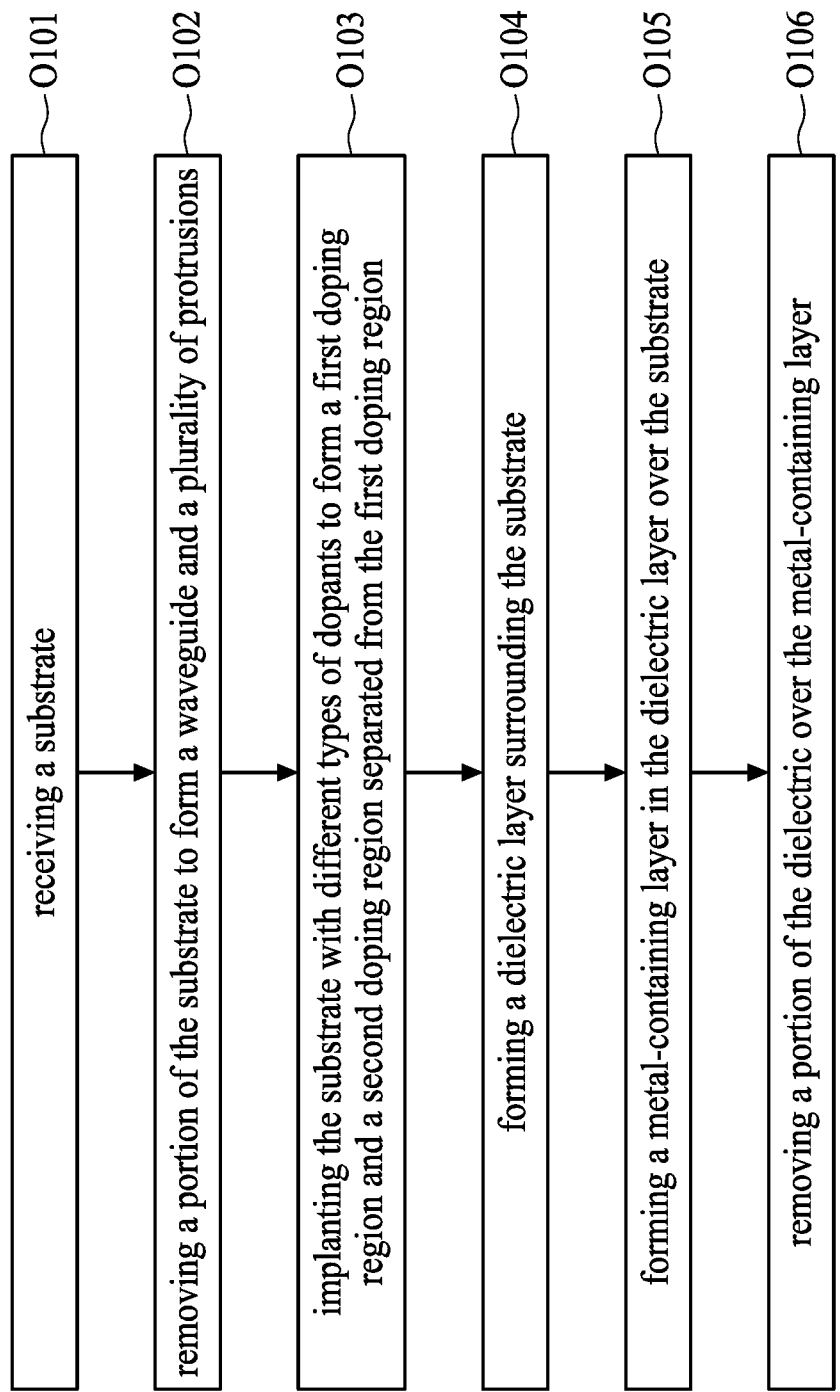
FIG. 17 is a flow chart of the method for forming an optical attenuating structure in accordance with different embodiments of the present disclosure.

In order to further illustrate the present disclosure, a method M10 for forming an optical attenuating structure is provided. FIG. 17 is a flow chart of the method M10. The method M10 includes several operations: (O101) receiving a substrate; (O102) removing portions of the substrate to form a plurality of protrusions with different heights; (O103) implanting the substrate with different types of dopants to form a first doping region and a second doping region separated from the first doping region; and (O104) forming a dielectric layer surrounding the substrate. In some embodiments, the method M10 further includes: (O105) forming a metal-containing layer in the dielectric layer over the substrate; and (O106) removing a portion of the dielectric over the metal-containing layer.

FIGS. 18-27 are cross sections illustrating different stages of manufacturing an optical attenuating structure by the method M10 according to some embodiments of the present disclosure.

Figure 18:
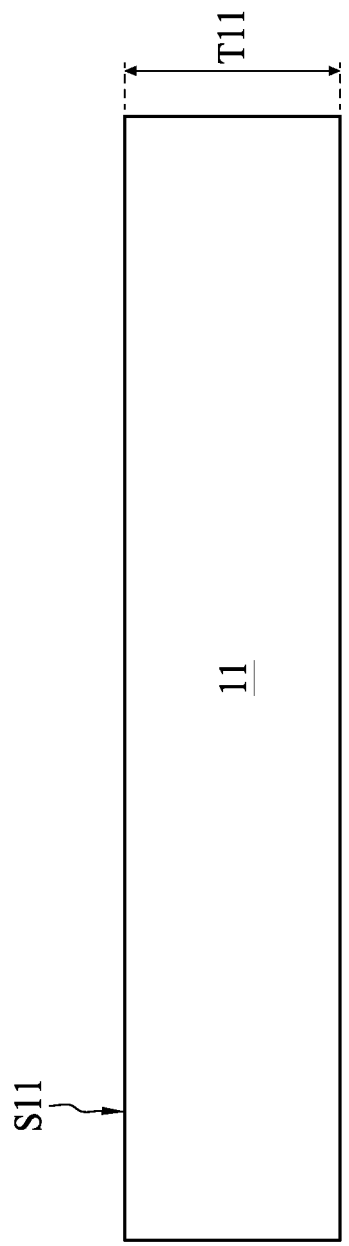
FIGS. 18-27 are cross sections of an optical attenuating structure at different stages of a method according to some embodiments of the present disclosure.
Figure 19:
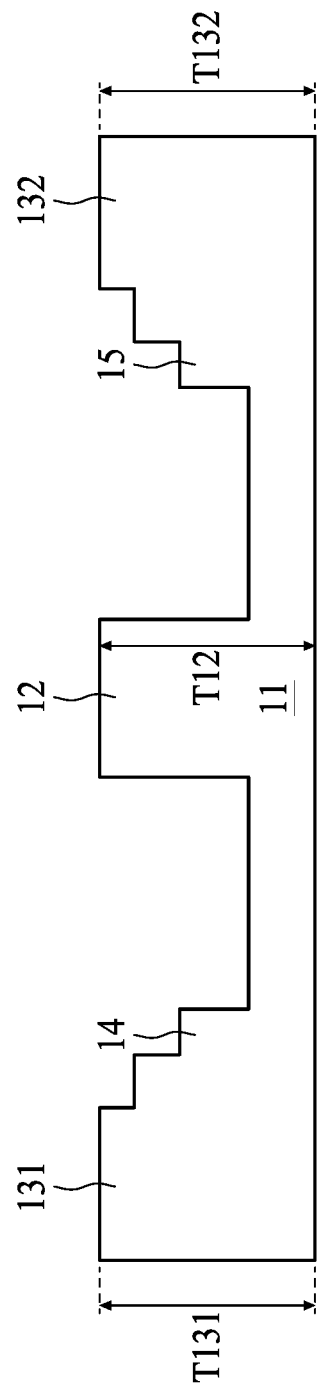
Figure 20:
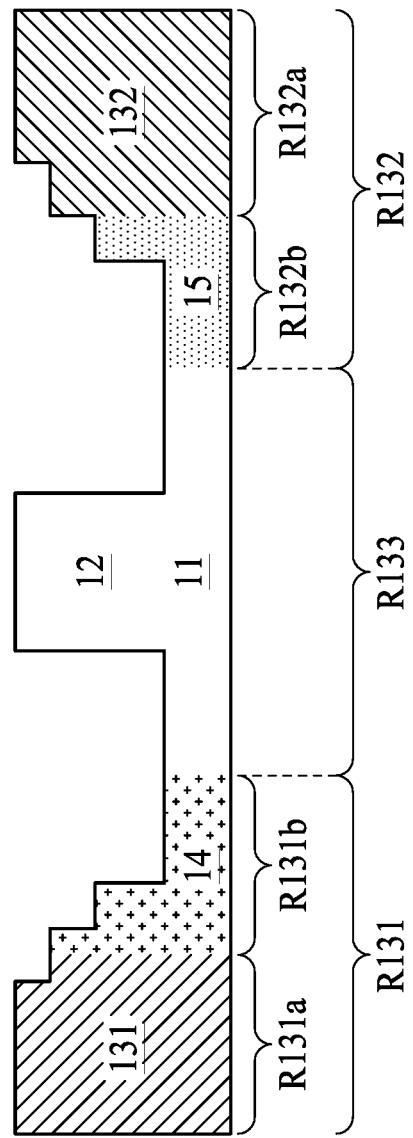

In accordance with the operations O101 and O102 as shown in FIGS. 18-19, a substrate 11 is received. In some embodiments, the substrate 11 includes semiconductive material. In some embodiments, the substrate 11 is a silicon substrate. In some embodiments, the substrate 11 can be a silicon layer of a silicon-on-insulator (SOI) substrate. An etching operation is performed to remove portions of the substrate 11 to form a plurality of protrusions. As shown in FIG. 20, a first protrusion, a second protrusion, a third protrusion are substantially parallel and respectively define the first electrode 131, the second electrode 132 and the waveguide 12. Fourth protrusions define the first optical attenuating member 14 and the second optical attenuating member 15 respectively. In the embodiment of FIG. 20, the fourth protrusions include a greatest height less than a height of the first protrusion or a height of the second protrusion, similar to the embodiments shown in FIGS. 7-8. In the embodiments, the first optical attenuating member 14 is connected to the first electrode 131, and the second optical attenuating member 15 is connected to the second electrode 132. However, the present disclosure is not limited herein. As illustrated above in different embodiments, the first optical attenuating member 14 and the second optical attenuating member 15 can be separated from the first electrode 131 and the second electrode 132, and/or have different configurations from a cross-sectional view.

The waveguide 12, the first electrode 131, the second electrode 132, the first optical attenuating member 14 and the second optical attenuating member 15 can be formed simultaneously or separately. In some embodiments, the waveguide 12, the first electrode 131, the second electrode 132, the first optical attenuating member 14 and the second optical attenuating member 15 can be formed by one or several times of etching operations. In some embodiments, the etching operation includes a dry etching operation. In the operation O102, different amount semiconductive material from a top surface S 11 of the substrate 11 along a depth direction (i.e. the Z direction in the embodiments) are removed. In some embodiments, a first portion of the substrate 11 in a first amount and a second portion of the substrate 11 in a second amount are removed. The first optical attenuating member 14 and the second optical attenuating member 15 having different heights from those of the waveguide 12, the first electrode 131 and the second electrode 132 can thereby formed. In some embodiments, a thickens T12 of the waveguide 12, a thickness T131 of the first electrode 131 and a thickness T132 of the second electrode 132 are substantially equal to a thickness T11 of the substrate 11. The thickness T12, the thickness T131 and the thickness T132 are measured from tops of the waveguide 12, the first electrode 131 and the second electrode 132 respectively to a bottom of the substrate 11 along the Z direction.

In accordance with the operation O103 as shown in FIG. 20, one or more times of implantations are performed on the substrate 11 to form the first doping region R131 having a first type of dopants and the second doping region R132 having second type of dopants different from the first type of dopants. Therefore, the protrusion defining the first electrode 131 has the first conductive type; the protrusion defining the second electrode 132 has the second conductive type different from the first conductive type; and the protrusion defining the waveguide 12 is in the intrinsic region R133. The first doping region R131 includes a first higher doping region R131*a* and a first lower doping region R131*b*. The first higher doping region R131*a* has a higher doping concentration than that of the first lower doping region R131*b*. The first higher doping region R131*a* covers at least the first electrode 131. In some embodiments, the first higher doping region R131*a* covers a portion of the first optical attenuating member 14. The first lower doping region R131*b* covers a portion of the substrate 11 between the first electrode 131 and the waveguide 12. The first lower doping region R131*b* may cover at least a portion of the first optical attenuating member 14. In some embodiments, the first optical attenuating member 14 is entirely disposed in the first lower doping region R131*b*.

The second doping region R132 includes a second higher doping region R132*a* and a second lower doping region R132*b*. The second higher doping region R132*a* has a higher doping concentration than that of the second lower doping region R132*b*. The second higher doping region R132 covers at least the second electrode 132. In some embodiments, the second higher doping region R132*a* covers a portion of the second optical attenuating member 15. The second lower doping region R132*b* covers a portion of the substrate 11 between the second electrode 132 and the waveguide 12. The second lower doping region R132*b* may cover at least a portion of the second optical attenuating member 15. In some embodiments, the second optical attenuating member 15 is entirely disposed in the second lower doping region R132*b*. The second doping region R132 has a different type of dopant from that of the first doping region R131. As illustrated above, covering areas and doping concentrations of the first doping region R131 and the second doping region R132 depend on different applications. In some embodiments, one or more masks are used to form the first doping region R131 and the second doping region R132.

Figure 21:
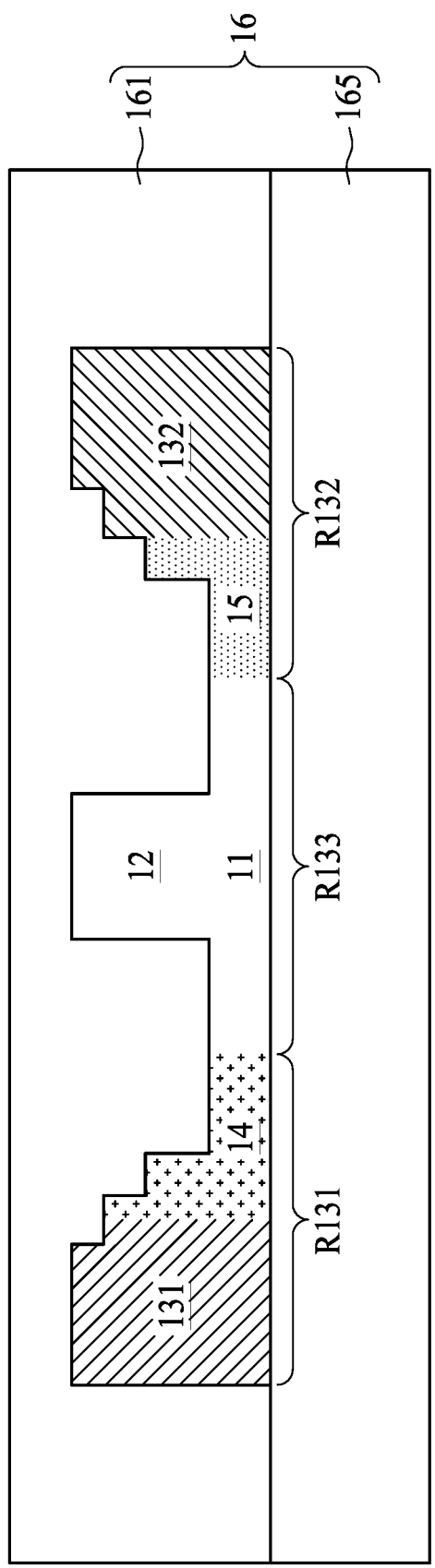
Figure 22:
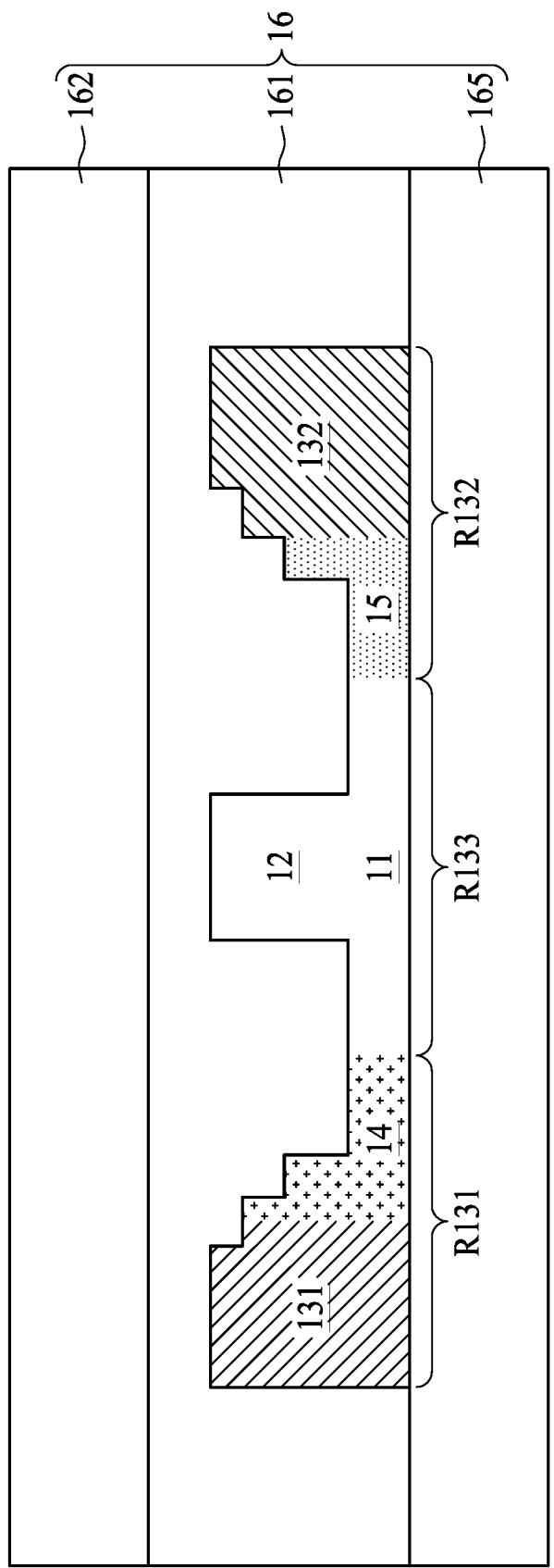

In accordance with the operation O104 as shown in FIGS. 21-22, the dielectric layer 16 is formed to surround the substrate 11. The dielectric layer 16 may be a multi-layer structure including an insulating layer 165 of the SOI substrate and a first sub-layer 161 formed over the SOI substrate encapsulating the substrate 11 as shown in FIG. 21. In some embodiments, the insulating layer 165 is a silicon oxide layer. In some embodiments, the dielectric layer 16 is a multi-layer structure and includes a plurality of sub-layers formed over the insulating layer 165 as shown in FIG. 22. The dielectric layer 16 may include the first sub-layer 161 surrounding the substrate 11 and a second sub-layer 162 disposed over the first sub-layer 161. It should be noted that only one second sub-layer 162 over the first sub-layer 161 is depicted for a purpose of illustration. In some embodiments, the dielectric layer 16 includes a plurality of sub-layers disposed over the sub-layer 161 and the insulating layer 165 of the SOI substrate.

Figure 23:
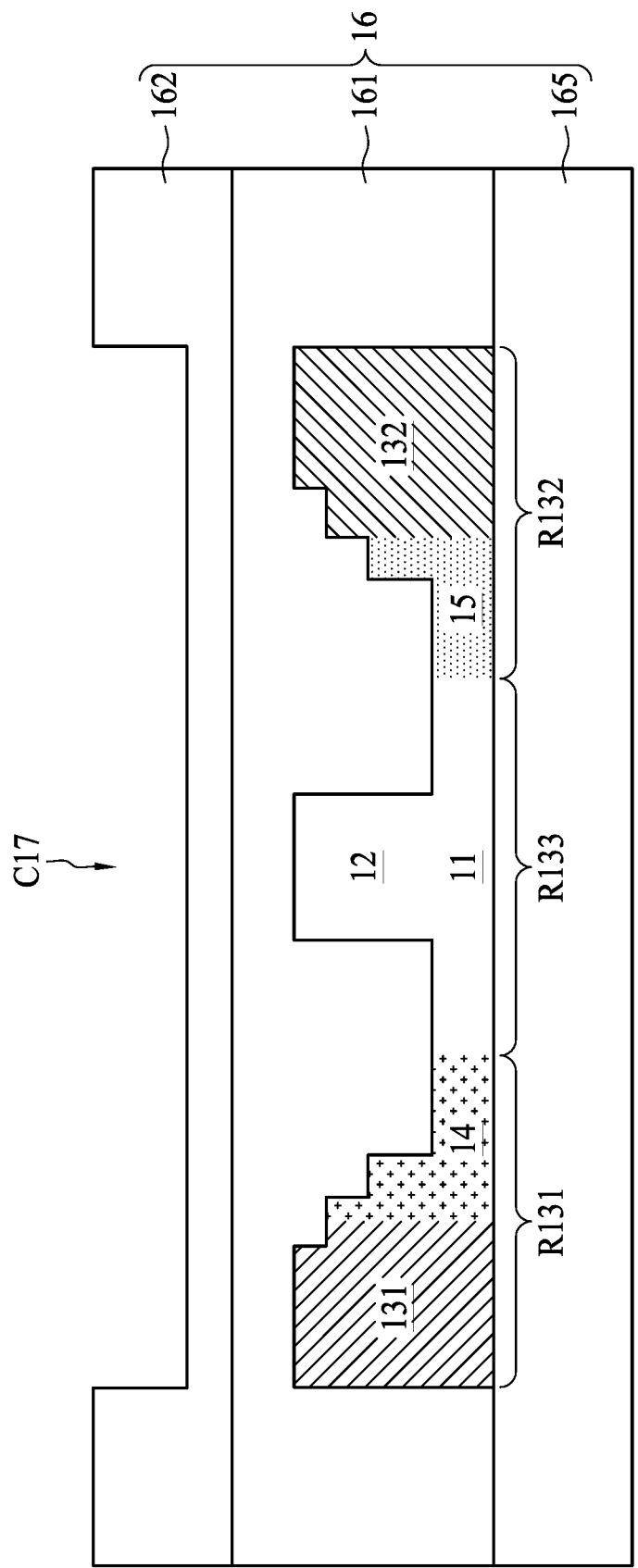
Figure 24:
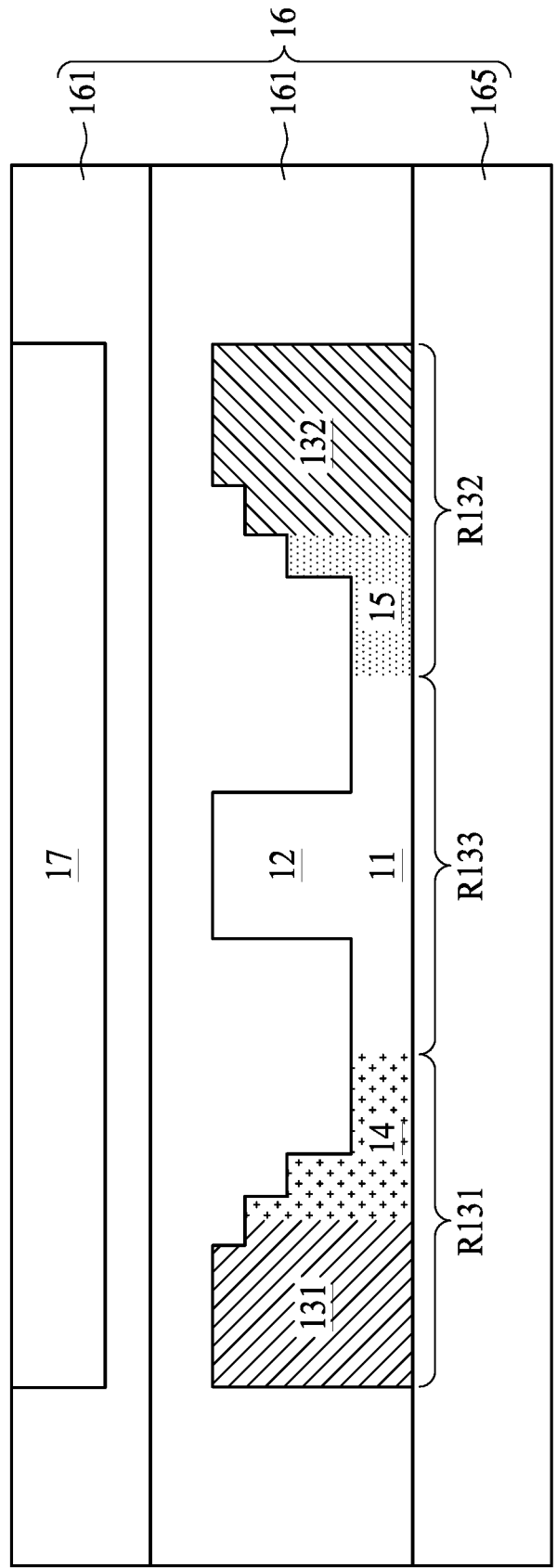

In accordance with the operation O105 as shown in FIGS. 23-24, a metal-containing layer is disposed in the dielectric layer 16 over the substrate 11 to form the heater 17. A portion of the dielectric layer 16 (or the sub-layer 162) is removed to form a cavity C17 to define a position of the heater 17 as shown in FIG. 23. In some embodiments, the cavity C17 penetrates the sub-layer 162 and exposes a portion of the sub-layer 161. In some embodiments, the cavity C17 stops in the sub-layer 162 without penetrating the sub-layer 162. Therefore, in some embodiments, a thickness of the heater 17 is equal to or less than a thickness of the sub-layer 162. The metal-containing layer is formed in the cavity C17. In some embodiments, the metal-containing layer is formed by a deposition operation. In some embodiments, a planarization is performed after the metal-containing layer is formed in the cavity C17 to form the heater 17.

Figure 25:
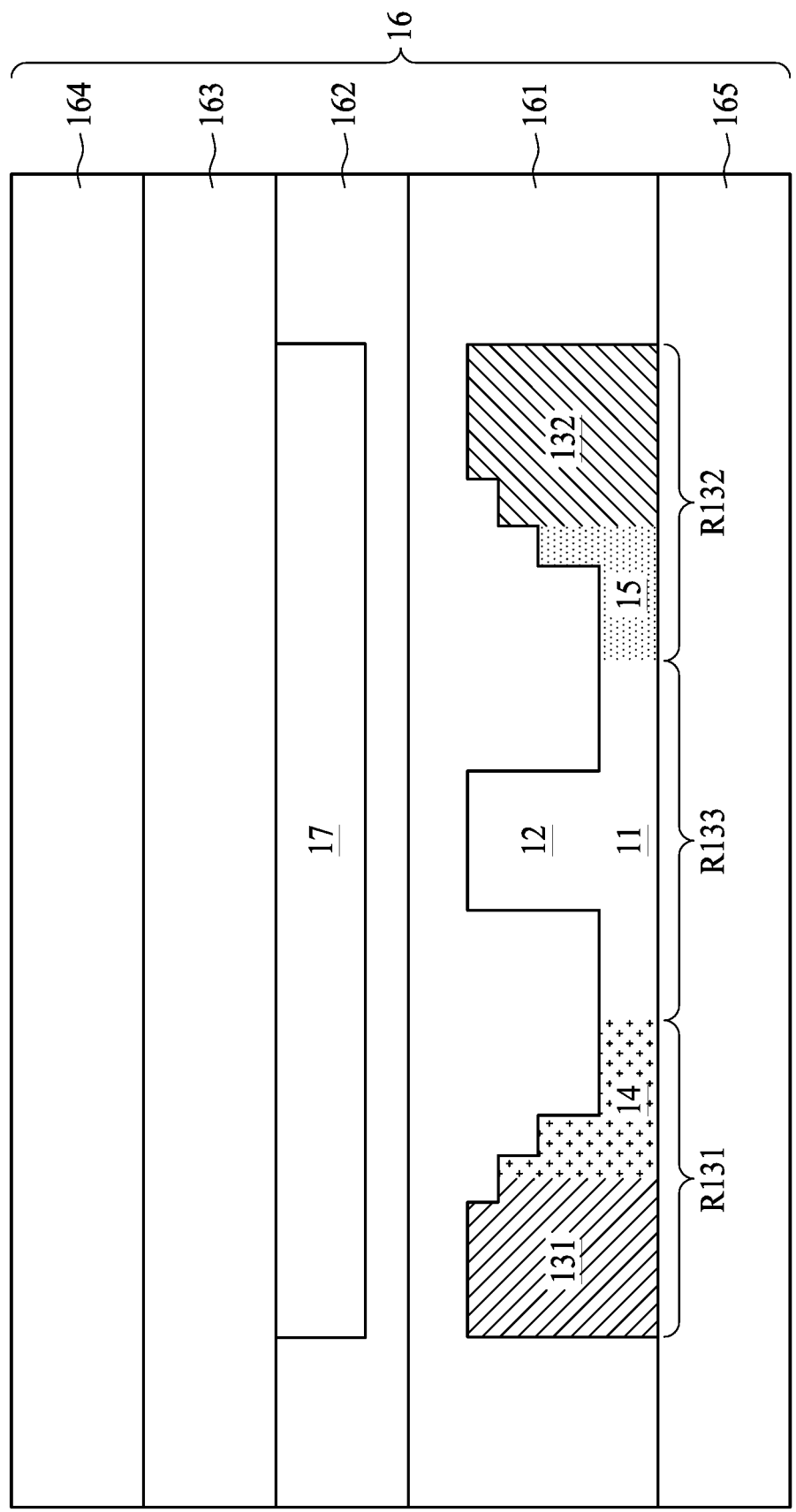

In some embodiments, one or more sub-layers of the dielectric layer 16 are formed over the heater 17 as shown in FIG. 25. The heater 17 is embedded in the dielectric layer 16. The dielectric layer 16 includes a sub-layer 163 and a sub-layer 164 disposed over the heater 17 for a purpose of illustration. In some embodiments, a number of sub-layers of the dielectric layer 16 depends on a number of IMD layers of the interconnect structure. In some embodiments, the sub-layer 164 is a top sub-layer of the dielectric layer 16 (or a top IMD layer of the interconnect structure).

Figure 26:
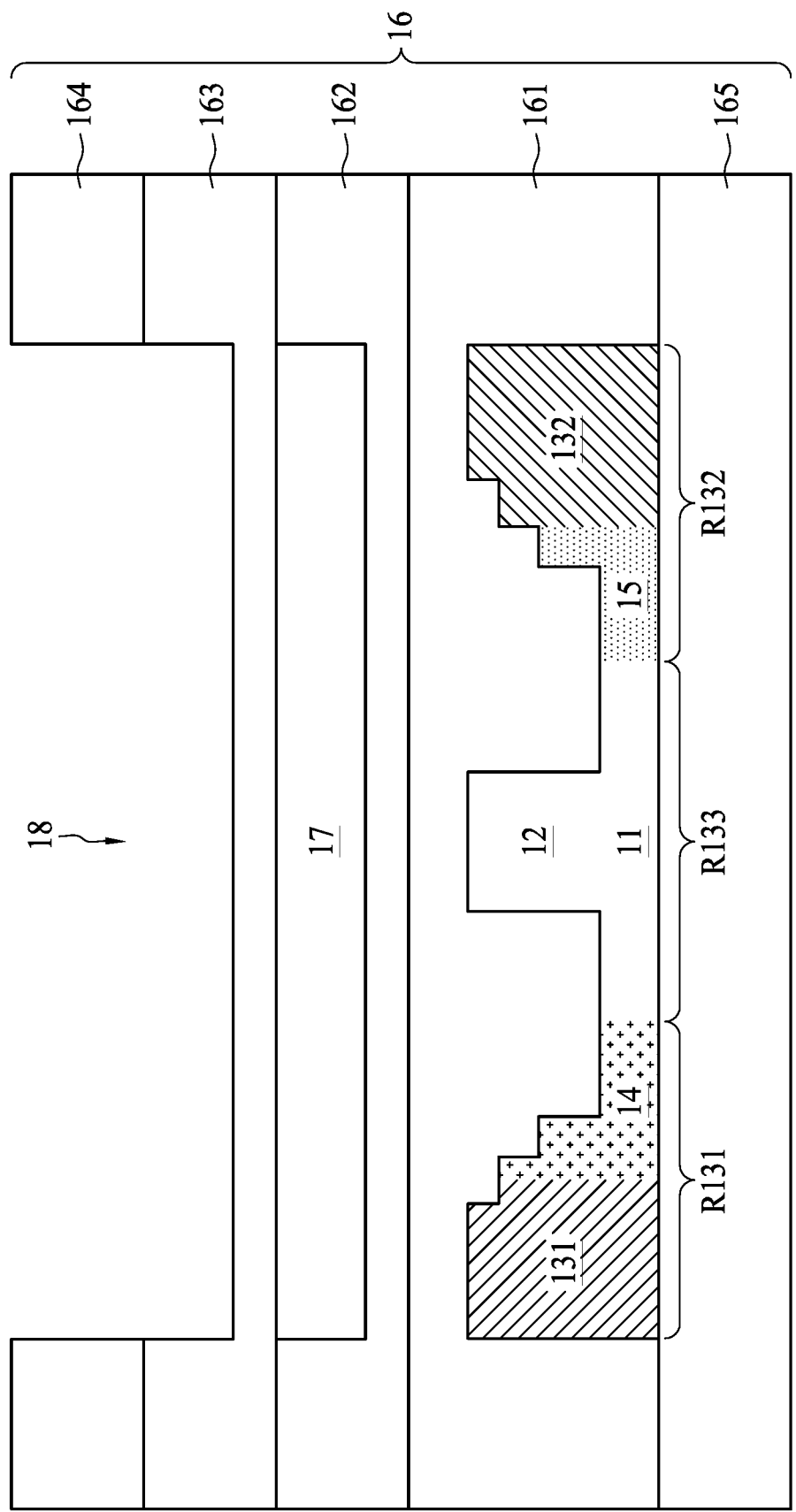

In accordance with the operation O106 as shown in FIG. 26, a portion of the dielectric layer 16 over the heater 17 is removed to form the upper first cavity 18. In some embodiments, the upper first cavity 18 penetrates one or more sub-layers (e.g. the sub-layer 164 in FIG. 26) of the dielectric layer 16. In some embodiments, the upper first cavity 18 stops at one of the sub-layer (e.g. the sub-layer 163 in FIG. 26) over the heater 17.

Figure 27:
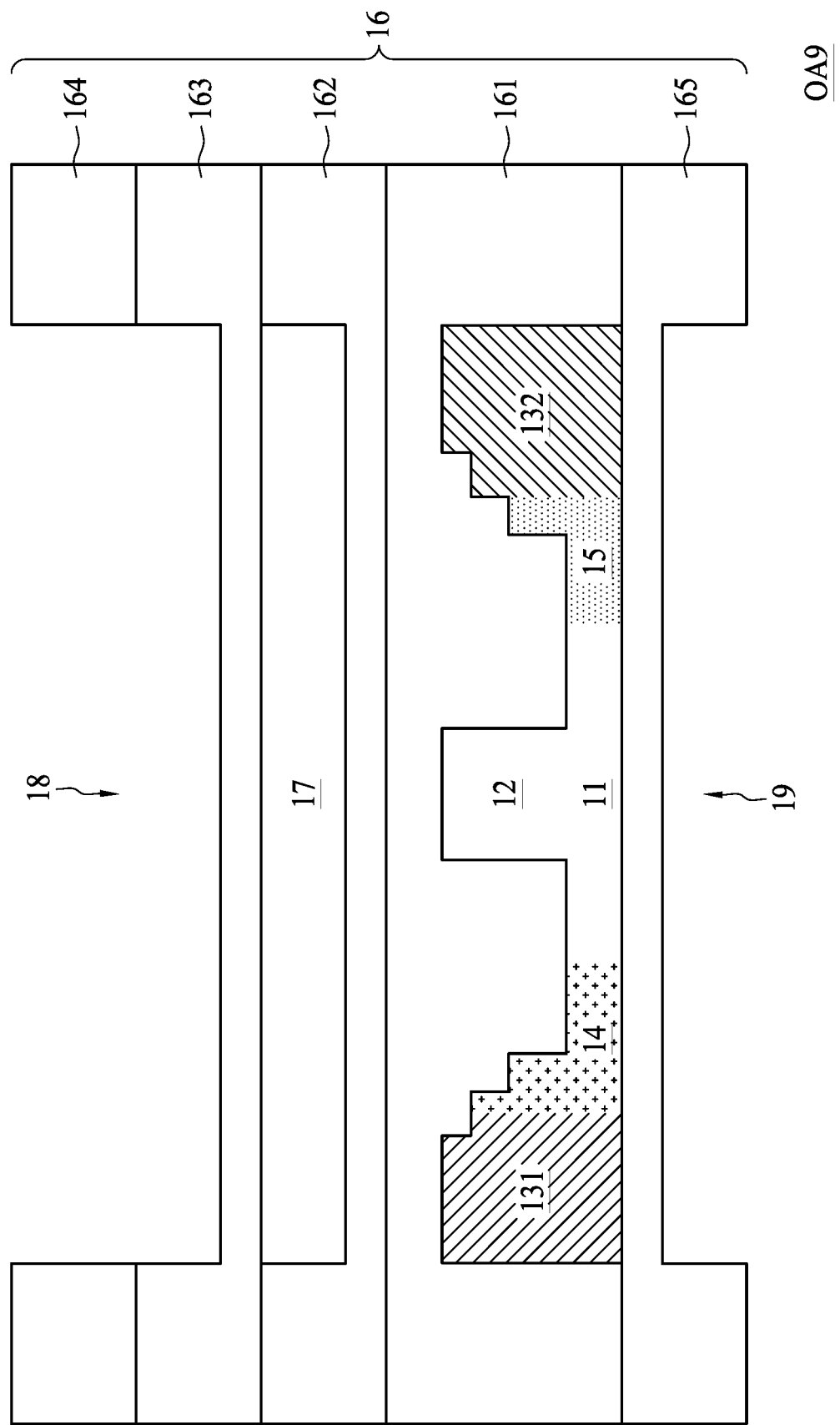

In some embodiments, the lower second cavity 19 is optionally formed as shown in FIG. 27. A portion of the dielectric layer 16 under the substrate 11 (e.g. a portion of the insulating layer 165 of the SOI substrate) is removed to form the lower second cavity 19. In some embodiments, the structure shown in FIG. 26 is flipped over, and an etching operation is performed to form the lower second cavity 19. It should be noted that portions of the SOI substrate covering the lower second cavity 19 may also be removed in order to form the lower second cavity 19.

In some embodiments, the upper first cavity 18 and/or the lower second cavity 19 are opening cavities. In some embodiments, the upper first cavity 18 and/or the lower second cavity 19 are closed cavities sealed by the dielectric layer.

Figure 28:
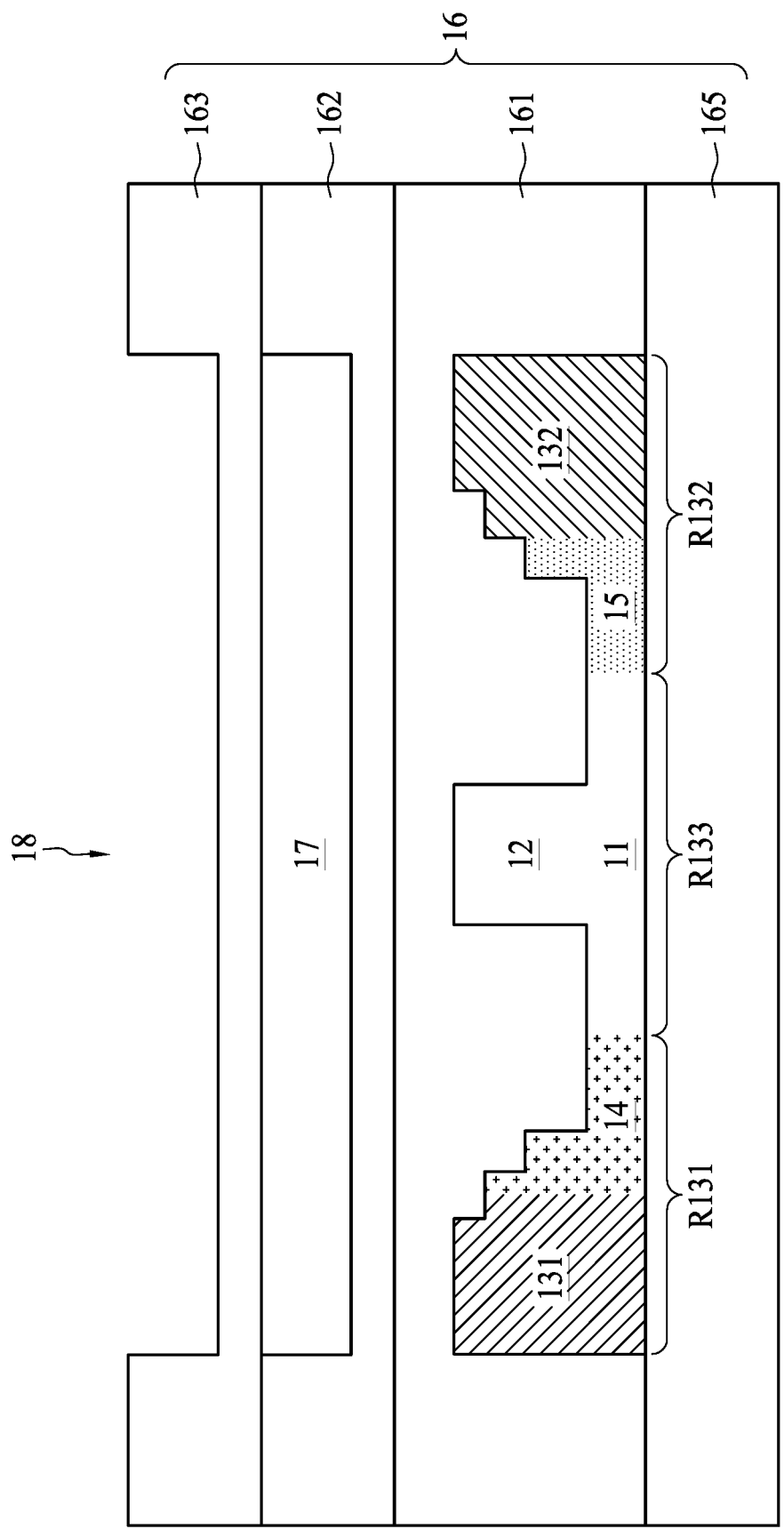
FIGS. 28-29 are cross sections of an optical attenuating structure at different stages of a method according to some embodiments of the present disclosure.
Figure 29:
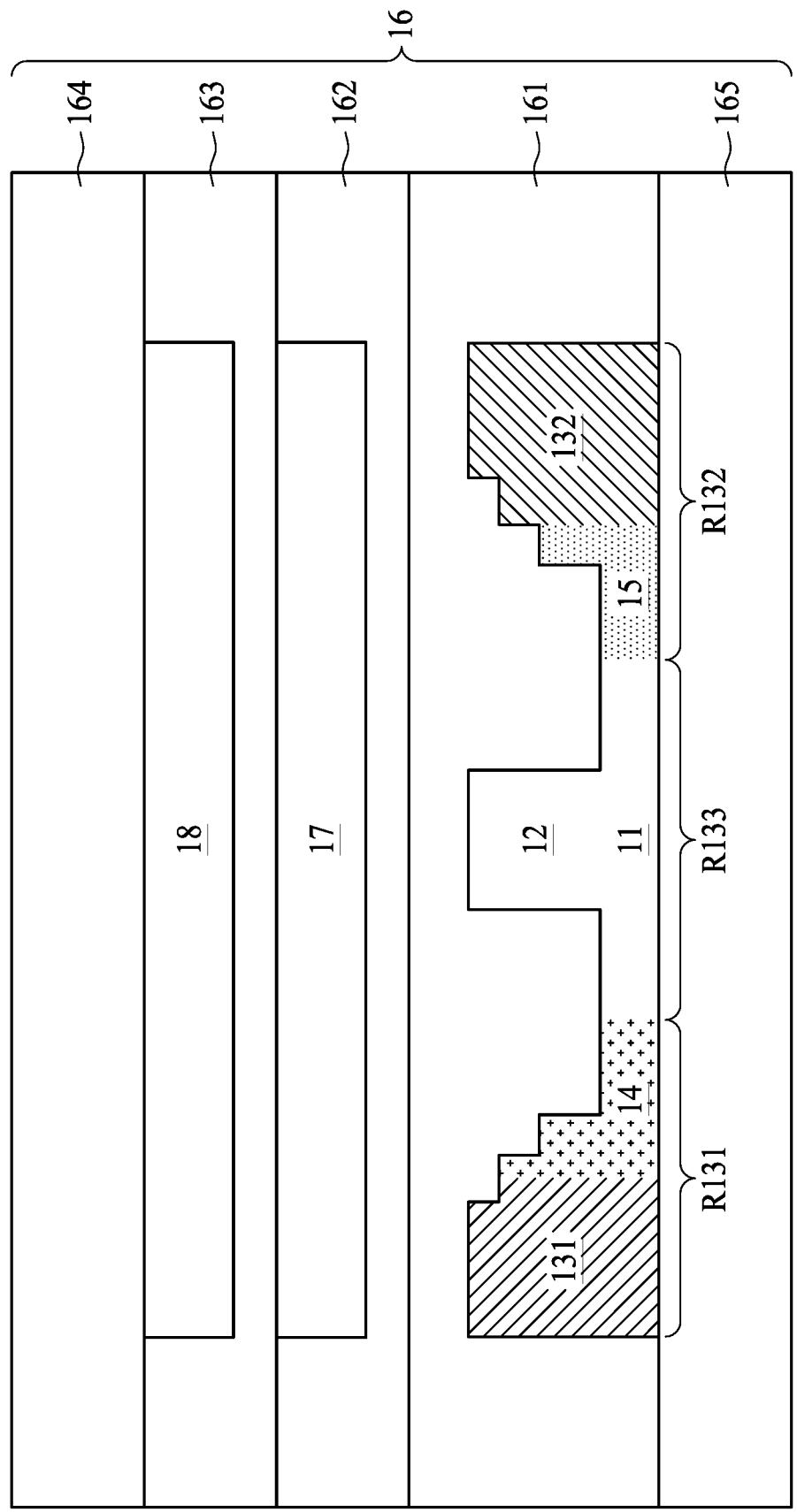

In accordance with some embodiments as shown in FIGS. 28-29, the upper first cavity 18 is formed after formation of the sub-layer 163 and prior to formation of the sub-layer 164. Therefore, less thickness of the dielectric layer 16 is removed to form the upper first cavity 18, and the upper first cavity 18 is sealed by the dielectric layer 16. In some embodiments, the upper first cavity 18 can penetrate multiple sub-layers of the dielectric layer 16. Similarly, the lower second cavity 19 can also be sealed by another sub-layer of the dielectric layer 16 formed under the substrate 11 and the lower second cavity 19 after formation of the lower second cavity 19 (not shown).

Some embodiments of the present disclosure provide an optical attenuating structure. The optical attenuating structure includes a substrate, a waveguide, doping regions, an optical attenuating member, and a dielectric layer. The waveguide is extended over the substrate. The doping regions is disposed over the substrate, and includes a first doping region, a second doping region opposite to the first doping region and separated from the first doping region by the waveguide, a first electrode extended over the substrate and in the first doping region, and a second electrode extended over the substrate and in the second doping region. The first optical attenuating member is coupled with the waveguide and disposed between the waveguide and the first electrode. The dielectric layer is disposed over the substrate and covers the waveguide, the doping regions and the first optical attenuating member.

Some embodiments of the present disclosure provide an optical attenuating structure. The optical attenuating structure includes a silicon portion and a dielectric portion surrounding the silicon portion. The silicon portion includes a first protrusion, a second protrusion, a third protrusion and a fourth protrusion. The first protrusion has a first conductive type, and the second protrusion has a second conductive type, different from the first conductive type. The third protrusion is disposed between the first protrusion and the second protrusion, wherein the first protrusion, the second protrusion, and the third protrusion are substantially parallel. The fourth protrusion is disposed between the first protrusion and the third protrusion wherein a height of the fourth protrusion is less than a height of the first protrusion or a height of the second protrusion.

Some embodiments of the present disclosure provide a method for forming an optical attenuating structure. The method includes multiple operations: receiving a semiconductor substrate; removing portions of the semiconductive substrate to form a plurality of protrusions with different heights; implanting the semiconductor substrate with different types of dopants to form a first doping region and a second doping region separated from the first doping region; and forming a dielectric layer surrounding the semiconductor substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. An optical attenuating structure, comprising:
   a substrate;
   a waveguide, extending along the substrate;
   a first doping region disposed over the substrate and extending along the waveguide;
   a second doping region opposite to the first doping region and separated from the first doping region by the waveguide;
   a first electrode extending along the substrate and in the first doping region;
   a second electrode extending along the substrate and in the second doping region;
   a first optical attenuating member, disposed between the waveguide and the first electrode and protruding from a surface of the substrate, wherein the first optical attenuating member includes a plurality of first portions and a plurality of second portions alternately arranged with the plurality of first portions along a longitudinal direction of the waveguide, and at least one of a first width and a first height of the plurality of first portions is less than that of the plurality of second portions; and
   a dielectric layer, disposed over the substrate and covering the waveguide, the first and second doping regions and the first optical attenuating member.

2. The optical attenuating structure of claim 1, wherein a height of the first optical attenuating member is substantially less than a height of the first electrode or the second electrode.

3. The optical attenuating structure of claim 1, wherein the waveguide, the first electrode and the second electrode are in parallel to each other.

4. The optical attenuating structure of claim 1, wherein the substrate, the waveguide and the first optical attenuating member are monolithic.

5. The optical attenuating structure of claim 1, further comprising:
a heater, disposed in the dielectric layer over the waveguide.

6. The optical attenuating structure of claim 1, further comprising:
a cavity disposed over the heater or under the substrate in the dielectric layer, wherein the cavity is filled with gas.

7. The optical attenuating structure of claim 1, wherein the first doping region includes a first type of dopants, and the second doping region includes a second type of dopants different from the first type of dopants.

8. The optical attenuating structure of claim 1, wherein the plurality of the first portions and the plurality of second portions are connected to the first electrode and the substrate.

9. The optical attenuating structure of claim 1, further comprising:
a second optical attenuating member coupled with the waveguide and disposed between the waveguide and the second electrode, wherein the second optical attenuating member is substantially symmetrical to the first optical attenuating member with respect to the waveguide.

10. An optical attenuating structure, comprising:
a silicon portion, comprising:
a first protrusion, having a first conductive type;
a second protrusion, having a second conductive type, different from the first conductive type;
a third protrusion, disposed between the first protrusion and the second protrusion, wherein the first protrusion, the second protrusion, and the third protrusion are substantially parallel; and
a fourth protrusion, disposed between the first protrusion and the third protrusion, wherein a height of the fourth protrusion is less than a height of the first protrusion or a height of the second protrusion, wherein the first protrusion, the second protrusion, the third protrusion and the fourth protrusion are separated from each other; and
a dielectric portion, surrounding the silicon portion.

11. The optical attenuating structure of claim 10, wherein a first distance between the fourth protrusion and the first protrusion is less than a second distance between the fourth protrusion and the third protrusion.

12. The optical attenuating structure of claim 10, wherein a height or a width of the fourth protrusion is less than that of the first protrusion or that of the third protrusion.

13. The optical attenuating structure of claim 10, wherein the fourth protrusion comprises a plurality of portions separately arranged along a longitudinal direction of the third protrusion.

14. The optical attenuating structure of claim 10, wherein the fourth protrusion includes a first portion having a first doping concentration and a second portion having a second doping concentration different from the first doping concentration.

15. The optical attenuating structure of claim 10, wherein a first portion of the fourth protrusion proximal to the first protrusion has a doping concentration greater than a doping concentration of a second portion of the fourth protrusion proximal to the third protrusion, and the first portion is adjacent to the second portion.

16. A method of manufacturing an optical attenuating structure, comprising:
receiving a substrate;
removing portions of the substrate to form a plurality of protrusions with different heights;
implanting the substrate with different types of dopants to form a first doping region and a second doping region separated from the first doping region;
forming a dielectric layer to surround the substrate; and
forming a cavity in the dielectric layer over the first doping region and the second doping region, wherein the cavity is filled with gas.

17. The method of claim 16, wherein the plurality of protrusions with different heights are formed simultaneously.

18. The method of claim 16, wherein the removal of the portions of the substrate including removing a first portion of the substrate in a first amount and removing a second portion of the substrate in a second amount different from the first amount.

19. The optical attenuating structure of claim 1, wherein a first width of a first higher doping region of the first doping region is different from a second width of a second higher doping region of the second doping region.

20. The optical attenuating structure of claim 13, wherein a height or a width of the plurality of portions of the fourth protrusion is less than that of the first protrusion.

* * * * *